US008219029B2

(12) United States Patent
Sugaya et al.

(10) Patent No.: US 8,219,029 B2
(45) Date of Patent: Jul. 10, 2012

(54) WIRELESS COMMUNICATION DEVICE, PROGRAM, METHOD, AND SYSTEM FOR COMMUNICATING OPERATION INSTRUCTION INFORMATION

(75) Inventors: Shigeru Sugaya, Kanagawa (JP); Hidemasa Yoshida, Tokyo (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 12/469,150

(22) Filed: May 20, 2009

(65) Prior Publication Data

US 2009/0291638 A1 Nov. 26, 2009

(30) Foreign Application Priority Data

May 22, 2008 (JP) ................................ P2008-133775

(51) Int. Cl.
*H04B 7/00* (2006.01)

(52) U.S. Cl. ................. 455/41.2; 455/422.1; 455/552.1; 370/345; 370/395.5

(58) Field of Classification Search ................. 455/41.2, 455/3.05, 422.1, 550.1, 552.1; 370/345, 370/395.5, 469
See application file for complete search history.

(56) References Cited

U.S. PATENT DOCUMENTS 6,947,427 B1 * 9/2005 Rokugo et al. ............. 370/395.5
2004/0132481 A1 * 7/2004 Sugaya ....................... 455/550.1
2005/0096031 A1 * 5/2005 Sugaya et al. ............. 455/422.1
2008/0247376 A1 10/2008 Del Prado Pavon et al.

FOREIGN PATENT DOCUMENTS

JP 2000-32153 1/2000
JP 2001-306197 11/2001
JP 2002-291067 10/2002
JP 2004-215073 7/2004
JP 2005-64653 3/2005
JP 2006-238548 9/2006
JP 2006-245906 9/2006
JP 2006-313976 11/2006
JP 2007-214842 8/2007
JP 2007-525891 9/2007
JP 2007-300532 11/2007
JP 2008-79197 4/2008
WO WO 03/003659 A1 1/2003
WO WO 2005/076543 8/2005
WO WO 2006/043242 A1 4/2006
WO WO 2006/120651 A2 11/2006

* cited by examiner

*Primary Examiner* — Shaima Q Aminzay
(74) *Attorney, Agent, or Firm* — Finnegan, Henderson, Farabow, Garrett & Dunner, L.L.P.

(57) ABSTRACT

A wireless communication device includes: a generation portion that generates management information for forming a wireless network with wireless communication devices in the vicinity, and operation instruction information that instructs operation of at least one of the wireless communication devices in the vicinity; and a communication portion that periodically transmits, to the wireless communication devices in the vicinity, management information to which the operation instruction information has been added.

20 Claims, 19 Drawing Sheets

FIG.13A

| Beacon Period Occupancy IE (BPOIE) | | | | | | |
|---|---|---|---|---|---|---|
| 1 | 1 | 1 | K | 2 | • • • | 2 |
| Element ID | Length | BP Length | Beacon Slot Info Bitmap | DevAddr 1 | • • • | DevAddr N |

FIG.13B

| Distributed Reservation Protocol (DRP) IE | | | | | | |
|---|---|---|---|---|---|---|
| 1 | 1 | 2 | 2 | 4 | ··· | 4 |
| Element ID | Length | DRP Control | Target/Owner DevAddr | DRP Allocation 1 | ··· | DRP Allocation N |

FIG.13C

| Hibernatin Mode IE | | | |
|---|---|---|---|
| 1 | 1 | 1 | 1 |
| Element ID | Length | Hibernatin Countdown | Hibernatin Duration |

FIG.13D

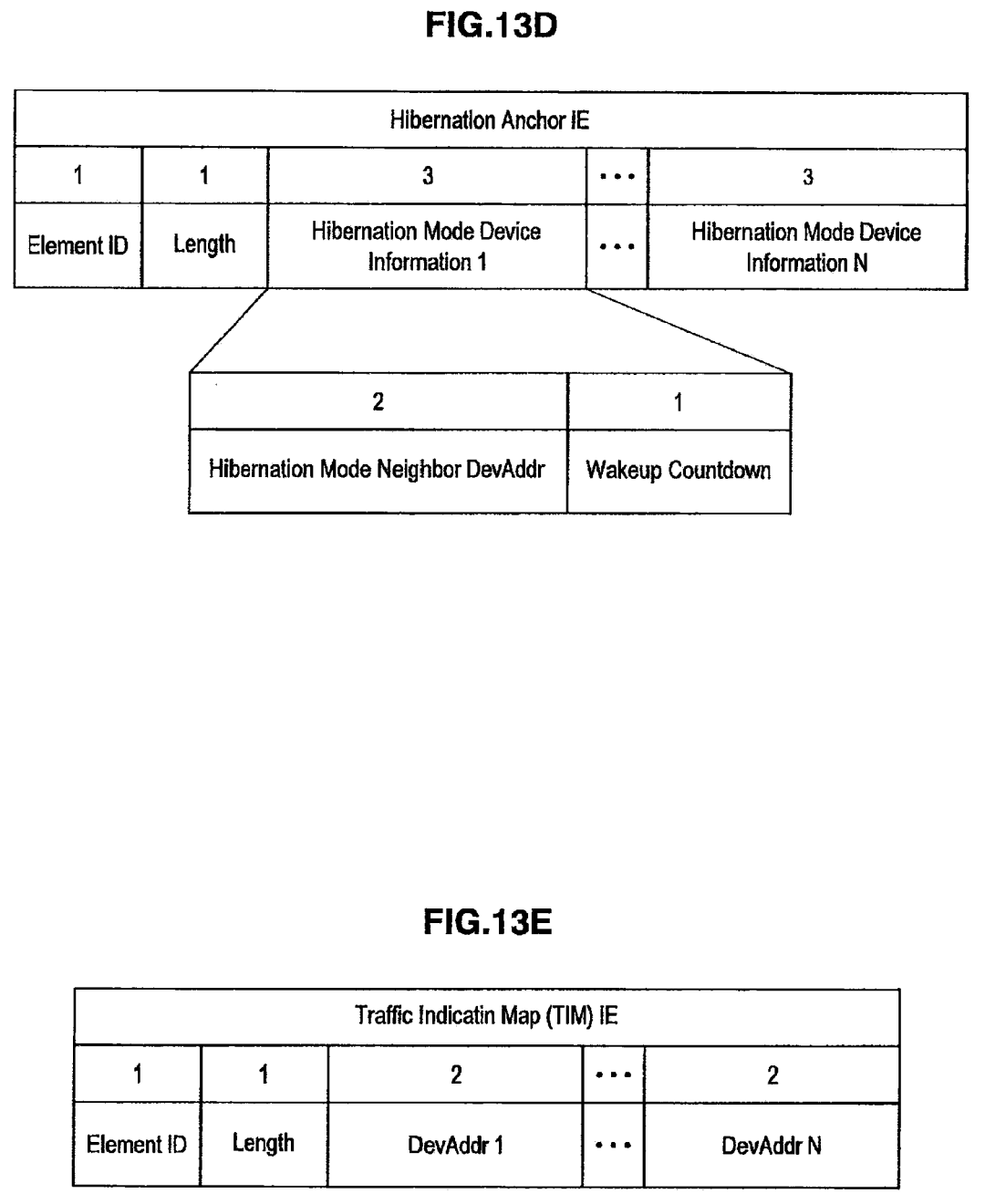

| Hibernation Anchor IE | | | | |
|---|---|---|---|---|
| 1 | 1 | 3 | ••• | 3 |
| Element ID | Length | Hibernation Mode Device Information 1 | ••• | Hibernation Mode Device Information N |

| 2 | 1 |
|---|---|
| Hibernation Mode Neighbor DevAddr | Wakeup Countdown |

FIG.13E

| Traffic Indicatin Map (TIM) IE | | | | |
|---|---|---|---|---|
| 1 | 1 | 2 | ••• | 2 |
| Element ID | Length | DevAddr 1 | ••• | DevAddr N |

FIG.14A

| Mouse Command IE | | | | | | |
|---|---|---|---|---|---|---|
| 1 | 1 | 2 | 2 | 1 | 1 | 2 |
| Element ID | Length | ASIE Specifier ID | Target DevAddr | Control Parameter | Operation Parameter | Activation Cycle |

FIG.14B

| Keyboard Command IE | | | | | |
|---|---|---|---|---|---|
| 1 | 1 | 2 | 2 | 2 | 2 |
| Element ID | Length | ASIE Specifier ID | Target DevAddr | Keyboard Parameter | Activation Cycle |

FIG.14C

| Remote Controller Command IE | | | | | |
|---|---|---|---|---|---|
| 1 | 1 | 2 | 2 | 2 | 2 |
| Element ID | Length | ASIE Specifier ID | Target DevAddr | Command Code | Activation Cycle |

FIG.14D

| Terminal Command IE | | | | | |
|---|---|---|---|---|---|
| 1 | 1 | 2 | 2 | 1 | N |
| Element ID | Length | ASIE Specifier ID | Target DevAddr | Length | Terminal Control Code |

FIG.14E

| Game Controller Command IE | | | | |
|---|---|---|---|---|
| 1 | 1 | 2 | 2 | 2 |
| Element ID | Length | ASIE Specifier ID | Target DevAddr | Game Control Code |

FIG.14F

| Equipment Controller Command IE | | | | |
|---|---|---|---|---|
| 1 | 1 | 2 | 2 | 2 |
| Element ID | Length | ASIE Specifier ID | Target DevAddr | Equipment Control Code |

WIRELESS COMMUNICATION DEVICE, PROGRAM, METHOD, AND SYSTEM FOR COMMUNICATING OPERATION INSTRUCTION INFORMATION

BACKGROUND OF THE INVENTION

1. Field of the Invention

The present invention relates to a wireless communication device, a program, a wireless communication method, and a wireless communication system.

2. Description of the Related Art

Recently, wireless communication systems with various specifications have been proposed. Each wireless communication system is used for applications according to communication speed. For example, Bluetooth (registered trademark) is used for audio applications running at 1 Mbps or less, and ZigBee defined by IEEE802.15.4 is used for communication between a remote controller or a mouse and a control target device. Further, a wireless local area network (LAN) is used for IP data communication between personal computers (PC), and an ultra wideband wireless communication system is used for information communication at 100 Mbps or more, for example, communication of high resolution image information.

Given this, in some cases, one wireless communication device is required to include a structure that is compatible with a plurality of wireless communication systems. For example, a set top box is required to include a structure that is compatible with both a system for transmitting image information to a display device, and a system for receiving commands such as channel selection from a remote controller. As a result, cost may be increased or the wireless communication device may have to be made larger.

Meanwhile, a method is also conceivable in which a wireless communication device including a structure that is compatible with one wireless communication system performs communication relating to a plurality of applications using the wireless communication system. For example, Japanese Patent Application Publication No. JP-A-2006-238548 describes a technology in which a wireless communication device compatible with a wireless USB forms a wireless USB network with a plurality of wireless communication devices compatible with applications like a display device or a digital camera. In this technology, the devices perform communication with each other.

Note that the above-described wireless USB conforms to the WiMedia Distributed MAC standard. It is specified in the standard that a super frame including a beacon period and a data transmission region is set at a predetermined cycle. Further, according to the standard, each wireless communication device makes a communication reservation in the beacon period, before performing communication in the data transmission region.

SUMMARY OF THE INVENTION

However, while a large volume of data such as image information is continuously transmitted over a plurality of super frames, a command transmitted from a remote controller, a mouse or the like has a small volume and is generated occasionally. Accordingly, a problem occurs, namely, it is difficult to make a communication reservation in a beacon period every time such a command (operation instruction information) is transmitted.

The present invention addresses the problems described above and provides a wireless communication device, a program, a wireless communication method, and a wireless communication system that are new and improved and that are capable of transmitting operation instruction information such as a command more easily.

According to an embodiment of the present invention, there is provided a wireless communication device that includes: a generation portion that generates management information for forming a wireless network with wireless communication devices in the vicinity, and operation instruction information that instructs operation of at least one of the wireless communication devices in the vicinity; and a communication portion that periodically transmits, to the wireless communication devices in the vicinity, management information to which the operation instruction information has been added.

The communication portion may receive from the wireless communication devices in the vicinity the management information to which the operation instruction information has been added. The wireless communication device may further include a detection portion that detects whether specific information, which indicates that one of the operation instruction information and the management information has not been correctly received by the wireless communication devices in the vicinity, is included in the management information received by the communication portion. When the specific information is detected by the detection portion, the communication portion may transmit management information to which the operation instruction information has been added again.

The wireless communication device may further include a determination portion that determines whether one of the management information and the operation instruction information has been correctly received by the communication portion. When the determination portion determines that one of the management information and the operation instruction information has not been correctly received, the generation portion may generate management information that includes the specific information.

The management information may further include information indicating that the operation instruction information is added, the operation instruction information being included, at the least, after the information.

The operation instruction information may include identification information of a targeted wireless communication device. Further, an upper limit on the amount of information that is allowed to be added to the management information may be set, and the operation instruction information may be added to the management information in a range that does not exceed the upper limit on the amount of information.

According to another embodiment of the present invention, there is provided a program that includes instructions that command a computer to function as: a generation portion that generates management information for forming a wireless network with wireless communication devices in the vicinity, and operation instruction information that instructs operation of at least one of the wireless communication devices in the vicinity; and a communication portion that periodically transmits, to the wireless communication devices in the vicinity, management information to which the operation instruction information has been added.

According to another embodiment of the present invention, there is provided a wireless communication method that includes the steps of: generating management information for forming a wireless network with wireless communication devices in the vicinity, and operation instruction information that instructs operation of at least one of the wireless communication devices in the vicinity; and periodically transmitting, to the wireless communication devices in the vicinity, management information to which the operation instruction information has been added.

According to another embodiment of the present invention, there is provided a wireless communication system that includes: a first wireless communication device; and a second wireless communication device that includes a generation portion that generates management information for forming a wireless network with the first wireless communication device, and operation instruction information that instructs operation of the first wireless communication device, and a communication portion that periodically transmits management information to which the operation instruction information has been added.

According to the embodiments of the present invention described above, the operation instruction information such as a command can be transmitted more easily.

BRIEF DESCRIPTION OF THE DRAWINGS

FIG. 13A is an explanatory diagram showing an example of the structure of a beacon period occupancy information element (BPO IE);

FIG. 13B is an explanatory diagram showing an example of the structure of a distributed reservation protocol information element (DRP IE);

FIG. 13C is an explanatory diagram showing an example of the structure of a hibernation mode IE;

FIG. 13D is an explanatory diagram showing an example of the structure of a hibernation anchor IE;

FIG. 13E is an explanatory diagram showing an example of the structure of a traffic indication map information element (TIM IE);

FIG. 14A is an explanatory diagram showing an example of the structure of a mouse command IE;

FIG. 14B is an explanatory diagram showing an example of the structure of a keyboard command IE;

FIG. 14C is an explanatory diagram showing an example of the structure of a remote controller command IE;

FIG. 14D is an explanatory diagram showing an example of the structure of a terminal command IE;

FIG. 14E is an explanatory diagram showing an example of the structure of a game controller command IE;

FIG. 14F is an explanatory diagram showing an example of the structure of an equipment controller command IE;

DETAILED DESCRIPTION OF THE PREFERRED EMBODIMENTS

Figure 1:
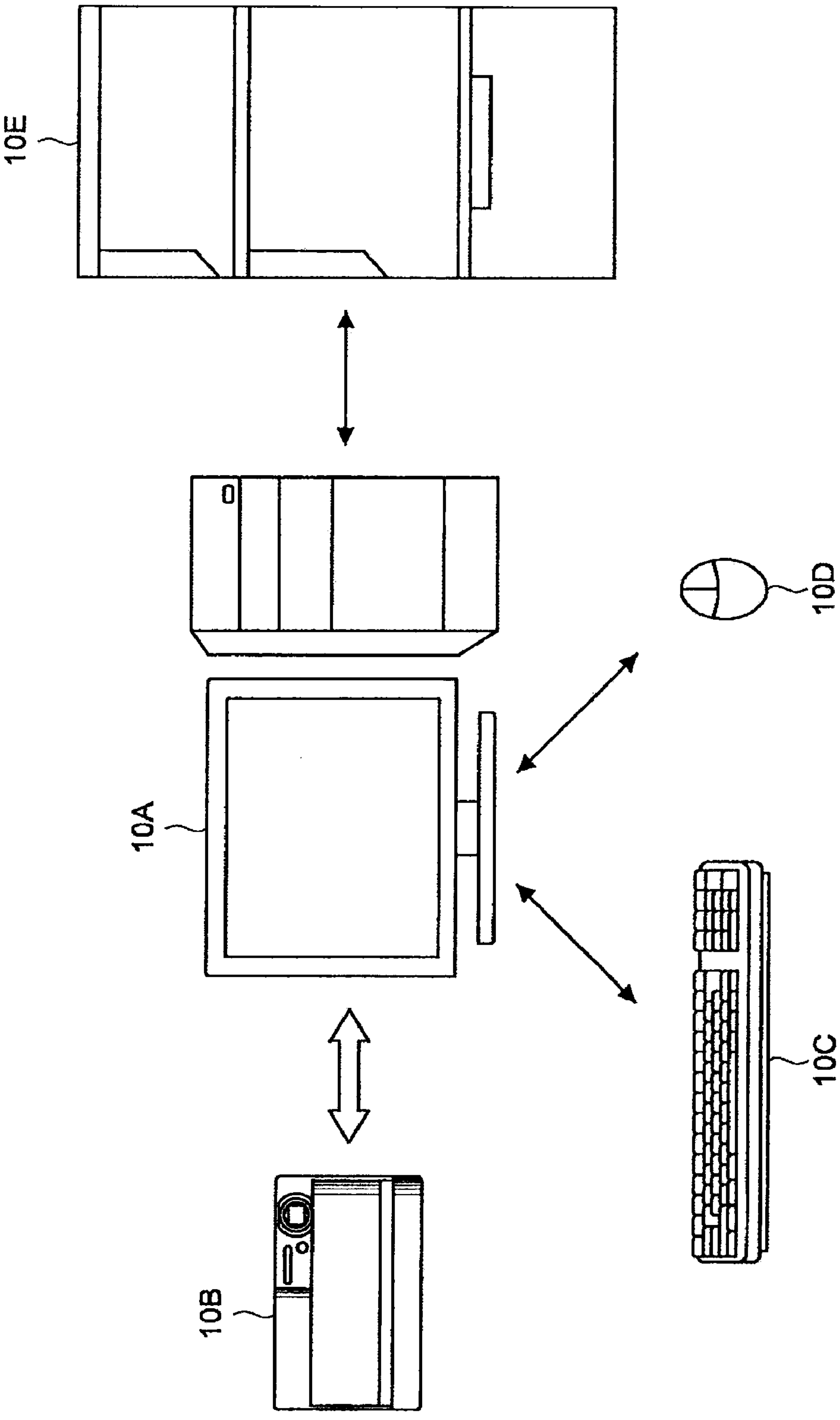
FIG. 1 is an explanatory diagram showing an example of the configuration of a wireless communication system in the vicinity of a personal computer (PC)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be explained in the order shown below.

1. Overview of the present embodiment 1-1. Example of the configuration of the present embodiment 1-2. Time sharing control 2. Background of the present embodiment 3. Detailed description of wireless communication device according to the present embodiment 3-1. Configuration of wireless communication device Structure of each frame, and examples of structure of information elements 3-2. Operation of wireless communication device 4. Conclusion

1. OVERVIEW OF THE PRESENT EMBODIMENT

1-1. Example of the Configuration of the Present Embodiment

First, an example of the configuration of a wireless communication system according to the present embodiment will be explained with reference to FIG. 1 to FIG. 4.

FIG. 1 is an explanatory diagram showing an example of the configuration of a wireless communication system in the vicinity of a PC. The wireless communication system shown in FIG. 1 includes a wireless communication device 10A (PC), a wireless communication device 10B (personal digital assistant), a wireless communication device 10C (key board), a wireless communication device 10D (mouse), and a wireless communication device 10E (household electrical appliance). These wireless communication devices 10A to 10E equitably transmit beacons and recognize the existence of the other devices, and form a wireless network. Note that, when it is not necessary to specifically distinguish between the wireless communication devices 10A to 10E, they are collectively and simply referred to as wireless communication devices 10.

In the wireless communication system shown in FIG. 1, the wireless communication device 10C (keyboard) generates a command from codes of characters input by a user, and transmits the command to the wireless communication device 10A (PC). Then, it is assumed that the wireless communication device 10A (PC) analyzes the command received from the wireless communication device 10C (keyboard), and operates based on the content input by the user. A relationship in which commands, instead of application data such as audio data and image data, are transmitted and received in this manner is shown by solid line arrows in FIG. 1. This also applies to FIG. 2 to FIG. 4.

The wireless communication device 10D (mouse) generates a command from parameters indicating an amount of movement and a click operation by a user, and transmits the command to the wireless communication device 10A (PC). Then, it is assumed that the wireless communication device 10A (PC) analyzes the command received from the wireless communication device 10D (mouse), and operates based on the amount of movement and the click operation of the wireless communication device 10D (mouse) performed by the user.

Further, the wireless communication device 10A (PC) may generate a command that instructs the operation of the wireless communication device 10E (household electrical appliance), and transmit the command to the wireless communication device 10E (household electrical appliance). For example, the wireless communication device 10E (household electrical appliance) may analyze the command received from the wireless communication device 10A (PC), and shift to a low power consumption mode based on the result of the analysis.

The wireless communication device 10B (personal digital assistant) can perform operation control of the wireless communication device 10A (PC) by transmitting a command to the wireless communication device 10A (PC). Also, the wireless communication device 10A (PC) can perform operation control of the wireless communication device 10B (personal digital assistant) by transmitting a command to the wireless communication device 10B (personal digital assistant).

Further, it is assumed that a given application data is transmitted and received between the wireless communication device 10A (PC) and the wireless communication device 10B (personal digital assistant). Examples of the given application data include audio data such as music, a lecture, a radio program, or the like, visual data such as a motion picture, a television program, a video program, a photograph, a document, a painting, a diagram, or the like, and any other type of data, such as a game, software, or the like. Note that a relationship in which the above application data, in addition to commands, is transmitted and received is shown by a double lined arrow in FIG. 1. This also applies to FIG. 2 and FIG. 3.

Figure 2:
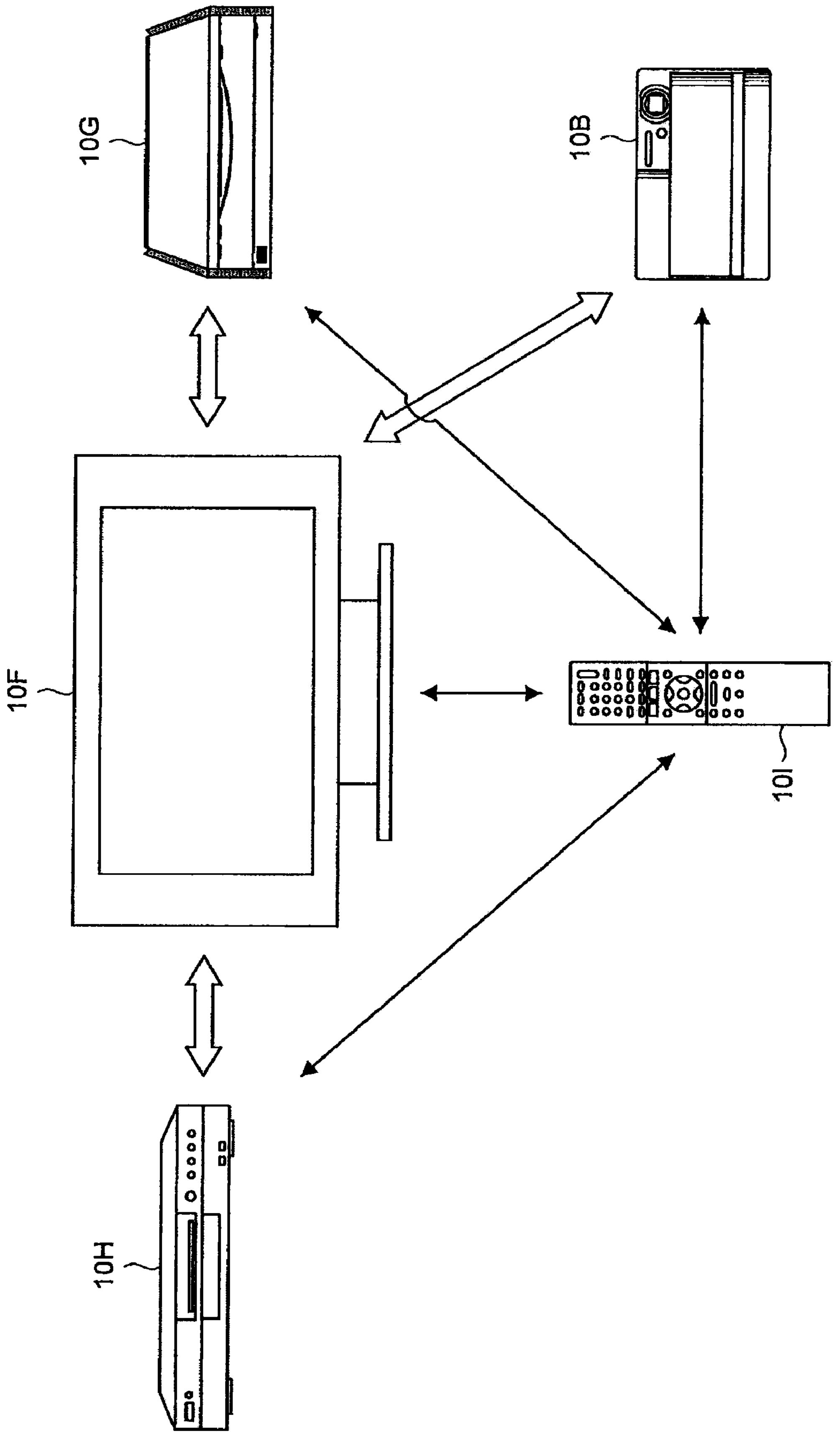
FIG. 2 is an explanatory diagram showing an example of the configuration of a wireless communication system in the vicinity of a display device.

FIG. 2 is an explanatory diagram showing an example of the configuration of a wireless communication system in the vicinity of a display device. The wireless communication system shown in FIG. 2 includes the wireless communication device 10B (personal digital assistant), a wireless communication device 10F (display device), a wireless communication device 10G (set top box), a wireless communication device 10H (video processing device), and a wireless communication device 10I (remote controller). These wireless communication devices 10B and 10F to 10I equitably transmit beacons and recognize the existence of the other devices, and form a wireless network.

In the wireless communication system shown in FIG. 2, the wireless communication device 10I (remote controller) generates a command in accordance with a button operation by a user, and transmits the command to the wireless communication device 10F (display device). It is assumed that the wireless communication device 10F (display device) analyzes the command received from the wireless communication device 10I (remote controller), and operates based on the button operation of the wireless communication device 10I (remote controller) performed by the user.

The wireless communication device 10H (video processing device) can perform operation control of the wireless communication device 10F (display device) by transmitting a command to the wireless communication device 10F (display device). Also, the wireless communication device 10F (display device) can perform operation control of the wireless communication device 10H (video processing device) by transmitting a command to the wireless communication device 10H (video processing device). For example, a command for simultaneously performing recording and playback of application data is transmitted and received between the wireless communication device 10F (display device) and the wireless communication device 10H (video processing device).

Further, it is assumed that the wireless communication device 10F (display device) generates a command that indicates a selected channel and transmits the command to the wireless communication device 10G (set top box), and the wireless communication device 10G (set top box) sends back a command that indicates an operation state of the channel. In other words, it is assumed that the wireless communication device 10F (display device) and the wireless communication device 10G (set top box) specify the operation of the other device, by operating the counterpart device or providing notification about an operation state.

The wireless communication device 10I (remote controller) generates a command in accordance with a button operation by a user, and transmits the command to the wireless communication device 10G (set top box). It is assumed that the wireless communication device 10G (set top box) analyzes the command received from the wireless communication device 10I (remote controller), and operates based on the button operation of the wireless communication device 10I (remote controller) performed by the user. Further, it is assumed that the wireless communication device 10B (personal digital assistant) also analyzes the command received from the wireless communication device 10I (remote controller), and operates based on the button operation of the wireless communication device 10I (remote controller) performed by the user.

The wireless communication device 10B (personal digital assistant) can perform operation control of the wireless communication device 10F (display device) by transmitting a command to the wireless communication device 10F (display device). Also, the wireless communication device 10F (display device) can perform operation control of the wireless communication device 10B (personal digital assistant) by transmitting a command to the wireless communication device 10B (personal digital assistant).

Figure 3:
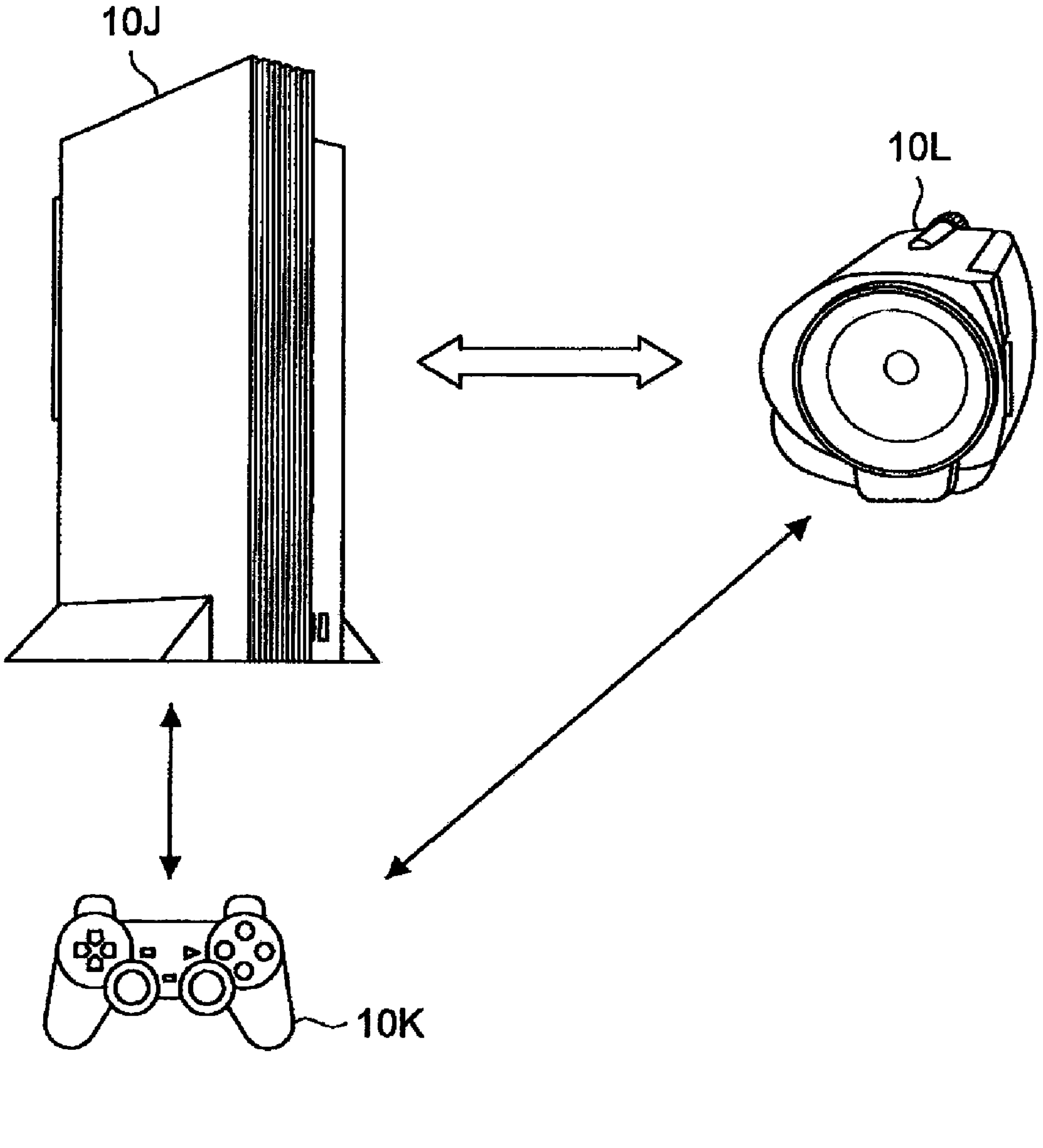
FIG. 3 is an explanatory diagram showing an example of the configuration of a wireless communication system in the vicinity of a game console.

FIG. 3 is an explanatory diagram showing an example of the configuration of a wireless communication system in the vicinity of a game console. The wireless communication system shown in FIG. 3 includes a wireless communication device 10J (game console), a wireless communication device 10K (controller), and a wireless communication device 10L (wireless camera). These wireless communication devices 10J to 10L equitably transmit beacons and recognize the existence of the other devices, and form a wireless network.

In the wireless communication system shown in FIG. 3, the wireless communication device 10K (controller) generates a command that indicates a user's operation, and transmits the command to the wireless communication device 10J (game console). It is assumed that the wireless communication device 10J (game console) analyzes the command received from the wireless communication device 10K (controller), and operates based on the user's operation of the wireless communication device 10K (controller). Further, it is assumed that the wireless communication device 10K (controller) transmits a command for controlling the direction of the wireless communication device 10L (wireless camera) as necessary, and the wireless communication device 10L (wireless camera) controls an imaging direction based on the command.

The wireless communication device 10J (game console) generates a command that indicates an operation in accordance with the progression of a game, and transmits the command to the wireless communication device 10K (controller). The wireless communication device 10K (controller) analyzes the command received from the wireless communication device 10J (game console), and vibrates, for example, a transducer incorporated in the wireless communication device 10K (controller) in accordance with the result of the analysis.

Further, it is assumed that both the wireless communication device 10J (game console) and the wireless communication device 10L (wireless camera) are able to identify the operations of the other device by transmitting and receiving commands relating to inter-related operations and operation states.

Figure 4:
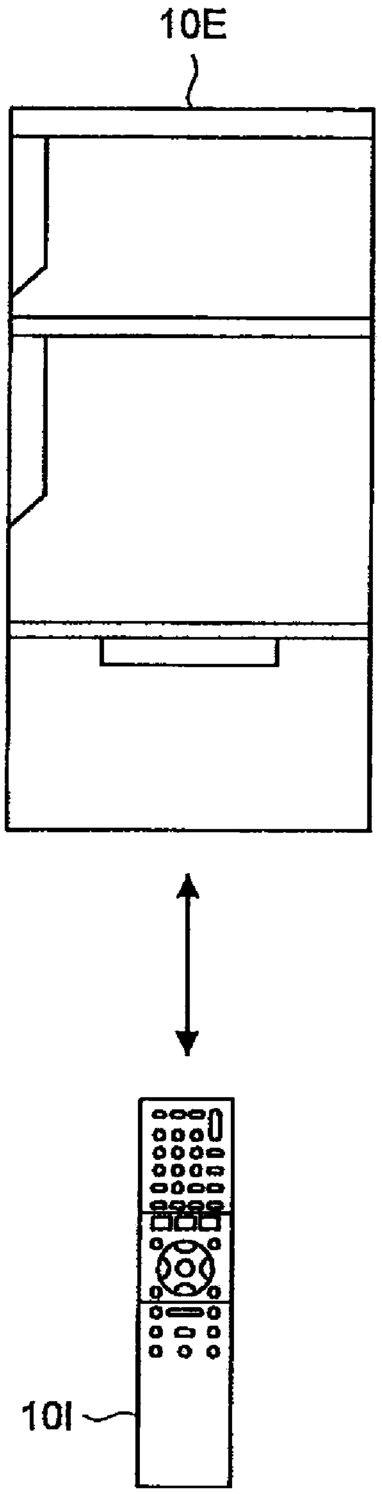
FIG. 4 is an explanatory diagram showing an example of the configuration of a wireless communication system in the vicinity of a household electrical appliance.

FIG. 4 is an explanatory diagram showing an example of the configuration of a wireless communication system in the vicinity of a household electrical appliance. The wireless communication system shown in FIG. 4 includes the wireless communication device 10E (household electrical appliance) and the wireless communication device 10I (remote controller). These wireless communication devices 10E and 10I equitably transmit beacons and recognize the existence of the other device, and form a wireless network.

In the wireless communication system shown in FIG. 4, the wireless communication device 10I (remote controller) generates a command in accordance with a button operation by a user, and transmits the command to the wireless communication device 10E (household electrical appliance). It is assumed that the wireless communication device 10E (household electrical appliance) analyzes the command received from the wireless communication device 10I (remote controller), and performs control in accordance with the result of the analysis.

Further, the wireless communication device 10E (household electrical appliance) generates a command that indicates an internal state or an operation state, and transmits the command to the wireless communication device 10I (remote controller). It is assumed that the wireless communication device 10I (remote controller) analyzes the command received from the wireless communication device 10E (household electrical appliance), and controls display on the wireless communication device 10I (remote controller) as necessary. For example, if the wireless communication device 10E (household electrical appliance) is a refrigerator, the wireless communication device 10I (remote controller) may display the internal temperature of the refrigerator based on the command from the wireless communication device 10E (household electrical appliance).

1-2. Time Sharing Control

Specific examples of the configuration of the wireless communication system according to the present embodiment have been described above with reference to FIG. 1 to FIG. 4. Next, time sharing control in a wireless communication system will be described with reference to FIG. 5 to FIG. 7.

Figure 5:
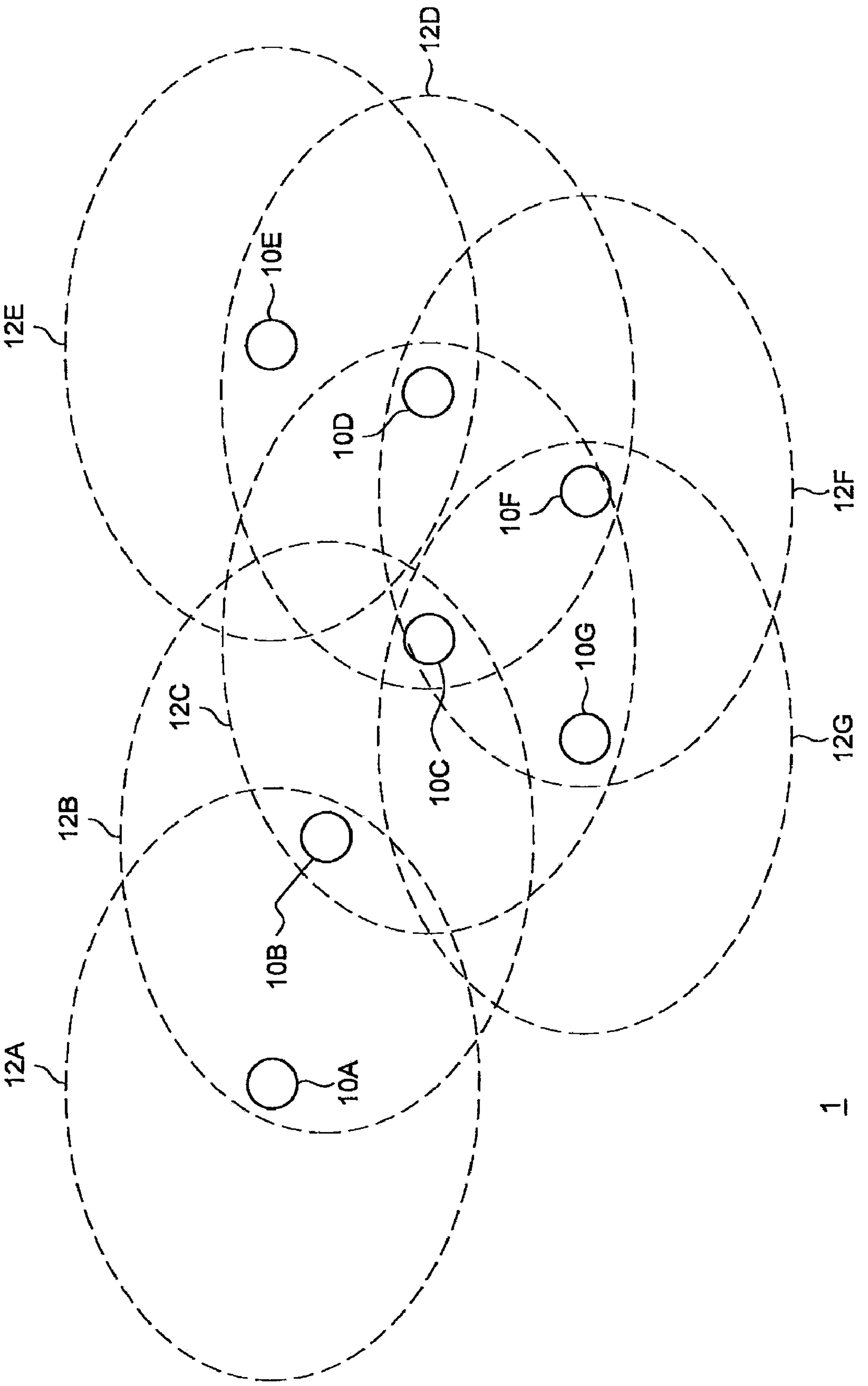
FIG. 5 is an explanatory diagram schematically showing a wireless communication system according to the present embodiment.

FIG. 5 is an explanatory diagram schematically showing a wireless communication system 1 according to the present embodiment. The circles shown in FIG. 5 indicate the wireless communication devices 10A to 10G. The areas shown by dotted lines indicate radio wave reachable ranges 12A to 12G in which the respective wireless communication devices 10A to 10G can perform communication.

More specifically, the wireless communication device 10A can directly communicate with the wireless communication device 10B that is within the radio wave reachable range 12A of the wireless communication device 10A. The wireless communication device 10B can directly communicate with the wireless communication devices 10A and 10C that are within the radio wave reachable range 12B of the wireless communication device 10B. Similarly, the wireless communication device 10C can directly communicate with the wireless communication devices 10B, 10D, 10F and 10G. The wireless communication device 10D can directly communicate with the wireless communication devices 10C, 10E and 10F. The wireless communication device 10E can directly communicate with the wireless communication device 10D.

Further, the wireless communication device 10F can directly communicate with the wireless communication devices 10C, 10D and 10G that are within the radio wave reachable range 12F of the wireless communication device 10F. Similarly, the wireless communication device 10G can directly communicate with the wireless communication devices 10C and 10F.

The above-described wireless communication devices 10A to 10G transmit and receive beacons, which are an example of management information, at a predetermined cycle, and form an autonomous distributed wireless network (an ad hoc network). Thus, the wireless communication devices 10A to 10G that form the wireless network can transmit and receive various types of application data.

Further, FIG. 5 shows the wireless communication system 1 and also shows the wireless network. Therefore, it can be understood that the terms wireless communication system 1 and wireless network can be used almost synonymously. However, generally, the term network indicates a structure including links in addition to nodes (wireless communication devices). Accordingly, it can also be understood that the wireless network is different from the wireless communication system 1 in that the wireless network includes links in addition to the wireless communication devices 10A to 10G.

As shown in FIG. 1 to FIG. 4, the wireless communication device 10 may also be an information processing device such as a home video processing device (a DVD recorder, a video deck, or the like), a mobile telephone, a Personal Handyphone System (PHS), a mobile music playback device, a mobile video processing device, a personal digital assistant (PDA), a home game console, a mobile game device, a household electrical appliance, or the like. Alternatively, the wireless communication device 10 may also be a device that is externally connected to the above information processing device.

Figure 6:
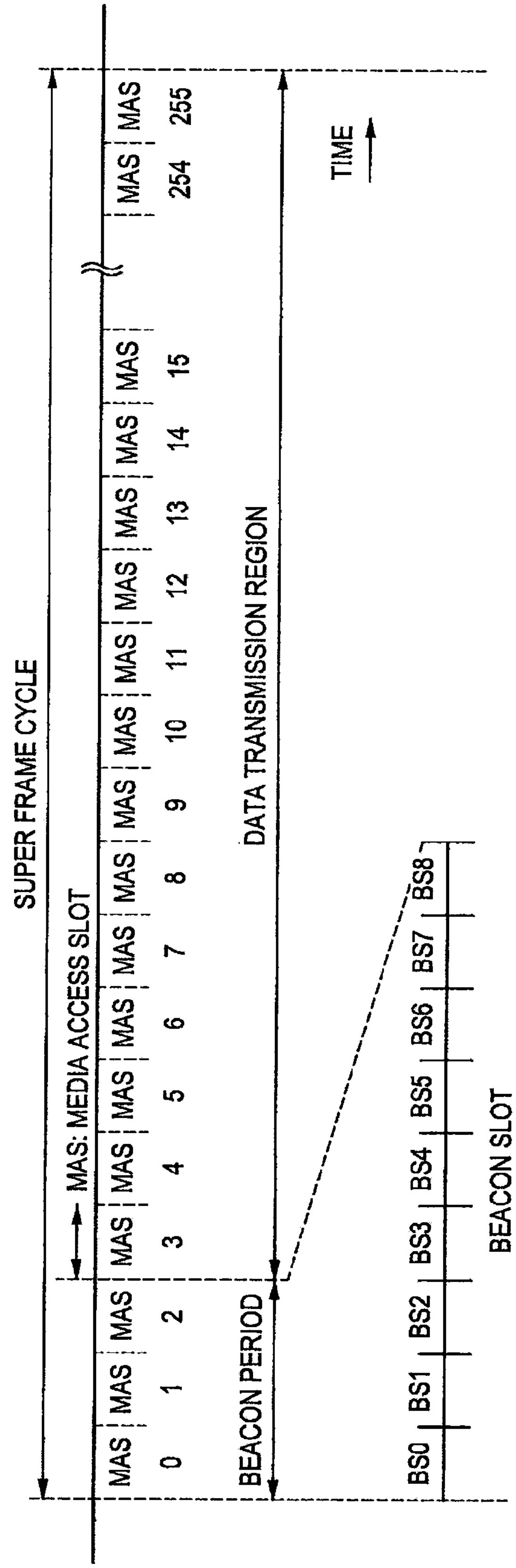
FIG. 6 is an explanatory diagram showing an example of the configuration of a super frame.

FIG. 6 is an explanatory diagram showing an example of the configuration of a super frame. The super frame cycle is defined by a predetermined time (for example, 65 ms), and is divided into 256 media access slots (MAS). The wireless communication devices 10 that form one wireless network share the super frame cycle as a specified period frame, and the divided MAS are used as units to transfer messages.

In addition, there is a beacon period (BP) that serves as a management domain for transmitting and receiving management information using a beacon (a beacon signal) at the head of the super frame, and beacon slots (BS) are arranged at specified intervals. Each wireless communication device 10 is set with a specified beacon slot, and can exchange parameters for performing network management or access control with the wireless communication devices 10 in the vicinity. FIG. 6 shows an example in which 9 beacon slots are set, namely, BS0 to BS8, as the beacon period. Note that, the period that is not set as the beacon period is normally used as a data transmission region for application data.

Figure 7:
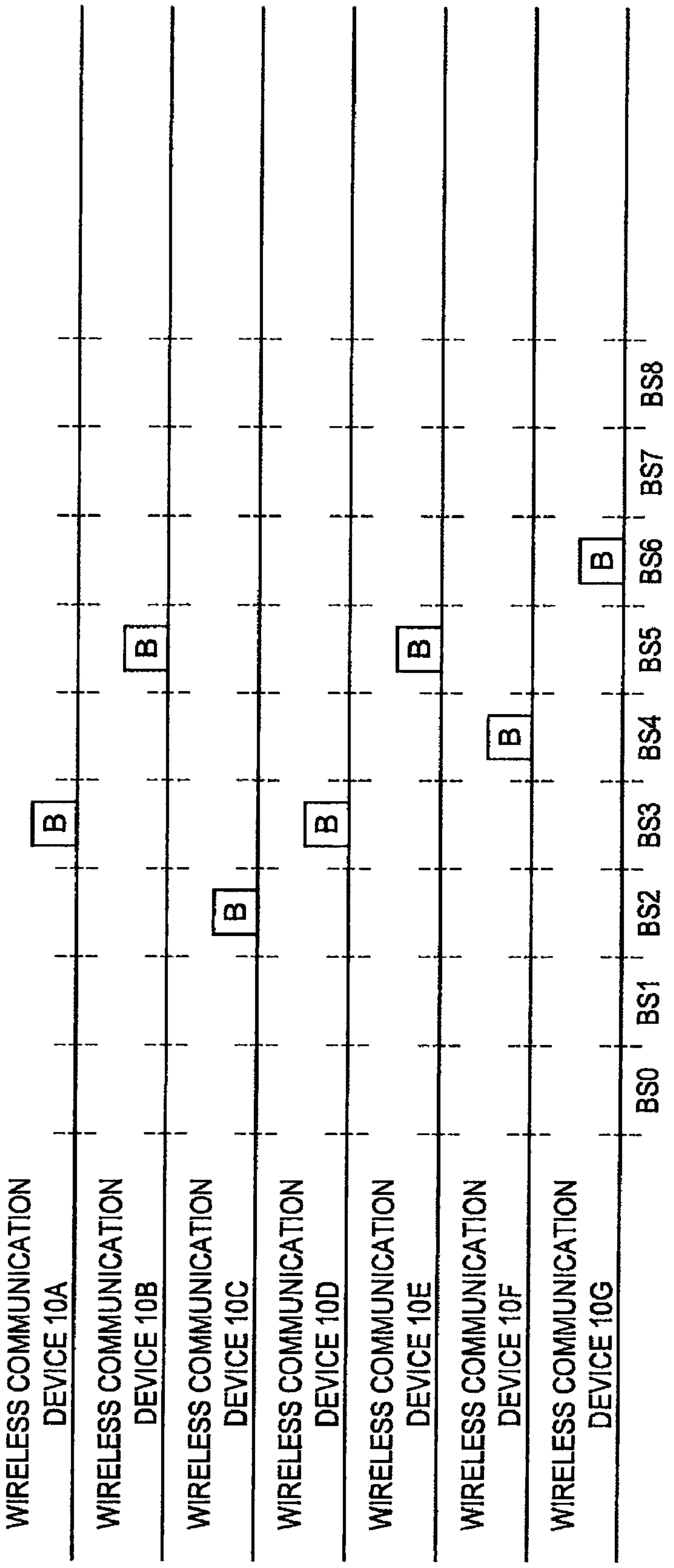
FIG. 7 is a conceptual diagram showing respective beacon slot positions that are set by each wireless communication device for itself.

FIG. 7 is a conceptual diagram showing respective beacon slot positions that are set by each wireless communication device 10 for itself in the case that the wireless communication devices 10A to 10G form one wireless communication system. FIG. 7 shows a state where, after all of the wireless communication devices 10 that form one wireless communication system 1 have notified each other about unoccupied beacon slots, each wireless communication device 10 has selected the beacon slot it is going to use.

In the example shown in FIG. 7, the wireless communication device 10A transmits its beacon using BS3, and the wireless communication device 10B transmits its beacon using BS5. Similarly, the wireless communication device 10C transmits its beacon using BS2, and the wireless communication device 10D transmits its beacon using BS3. The wireless communication device 10E transmits its beacon using BS5. Further, the wireless communication device 10F transmits its beacon using BS4, and the wireless communication device 10G transmits its beacon using BS6.

In the example shown in FIG. 7, the wireless communication device 10A and the wireless communication device 10D share use of the shared BS3, and the wireless communication device 10B and the wireless communication device 10E share use of the shared BS5. However, the wireless communication device 10A and the wireless communication device 10D are away from each other by 3 hops or more, and the wireless communication device 10B and the wireless communication device 10E are also away from each other by 3 hops or more. Therefore, it is assumed that a plurality of wireless communication devices can use the shared BS without any practical problems.

Note that, in order that a wireless communication device can newly join the wireless communication system 1, BS0, BS1, BS7 and BS8 can be reserved as necessary. Normally, a specified number of free beacon slots are provided after the beacon slot of each wireless communication device 10. The free beacon slots are provided in case a wireless communication device newly joins the wireless communication system 1.

2. BACKGROUND OF THE PRESENT EMBODIMENT

Next, the background of the present embodiment will be described. A physical layer of an ultra wideband wireless communication system is defined in the WiMedia multiband orthogonal frequency division multiplexing physical layer (WiMedia Multiband OFDM PHY) specification. More specifically, a communication method using a physical layer of 53.3 Mbps to 480 Mbps is defined.

The WiMedia Distributed MAC specification describes that a super frame including a beacon period and a data transmission region is set at a predetermined cycle. Further, the WiMedia Distributed MAC specification defines a method for exchanging, at every beacon period, management information necessary for maintaining a network, such as information relating to connection between the device itself and wireless communication devices in the vicinity.

Further, the WiMedia Distributed MAC specification defines best effort communication by prioritized contention access (PCA) control, and reservation control type communication that assures quality of service (QoS) by distributed reservation protocol (DRP) control.

The wireless communication systems like those described above that have been defined are mainly used for high-speed transmission of application data. However, depending on the application device connected to a wireless communication device, low-speed information communication is required. For example, while a vast amount of information is required for information communication from a set top box to a display device, only a single command is transmitted from a remote controller to the set top box.

Therefore, various standards of wireless communication systems have been proposed, and each wireless communication system is applied to applications depending on communication speed. For example, as a system suitable for a communication speed of 1 Mbps or less, a system using Bluetooth, a system that operates with low power consumption, such as ZigBee defined by the IEEE 802.15.4 specification, and the like are known. Further, as a system suitable for a communication speed of 100 Mbps or more, a wireless communication system that achieves super high-speed transmission, such as the ultra wideband wireless communication system is known.

However, sometimes one wireless communication device is required to incorporate a structure that is compatible with a plurality of wireless communication systems and as a result the cost and size of the wireless communication device have to be increased. For example, a set top box is required to incorporate a structure that is compatible with both a system for transmitting image information to a display device, and a system for receiving a command such as channel selection from a remote controller.

Further, while there is an increasing demand for size reduction of wireless communication devices, antennas corresponding to respective systems are provided on each wireless communication device. As a result, sometimes the surface of each wireless communication device is covered with the antennas. Moreover, in order to avoid interference between the systems, a filter that is more expensive than usually necessary needs to be provided in the wireless communication device, causing a cost increase.

If a wireless communication system that is formed of application devices having different communication speeds is configured, it is conceivable that stable data communication can be achieved by each wireless communication device reserving a specific slot in a data transmission region. Although such reserved communication is suitable for continuously transmitting a vast amount of information of a few mega bps, it is not effective when single commands are transmitted occasionally or when transmitting data containing a small amount of information, such as audio information, quantitatively in a few seconds. Moreover, when the reserved slot is away from a beacon period, two start-up operations are necessary for one super frame. Therefore, low power consumption operation is difficult to achieve.

Next, the flow of command exchange in a wireless communication system relating to the present embodiment will be described with reference to FIG. 8.

Figure 8:
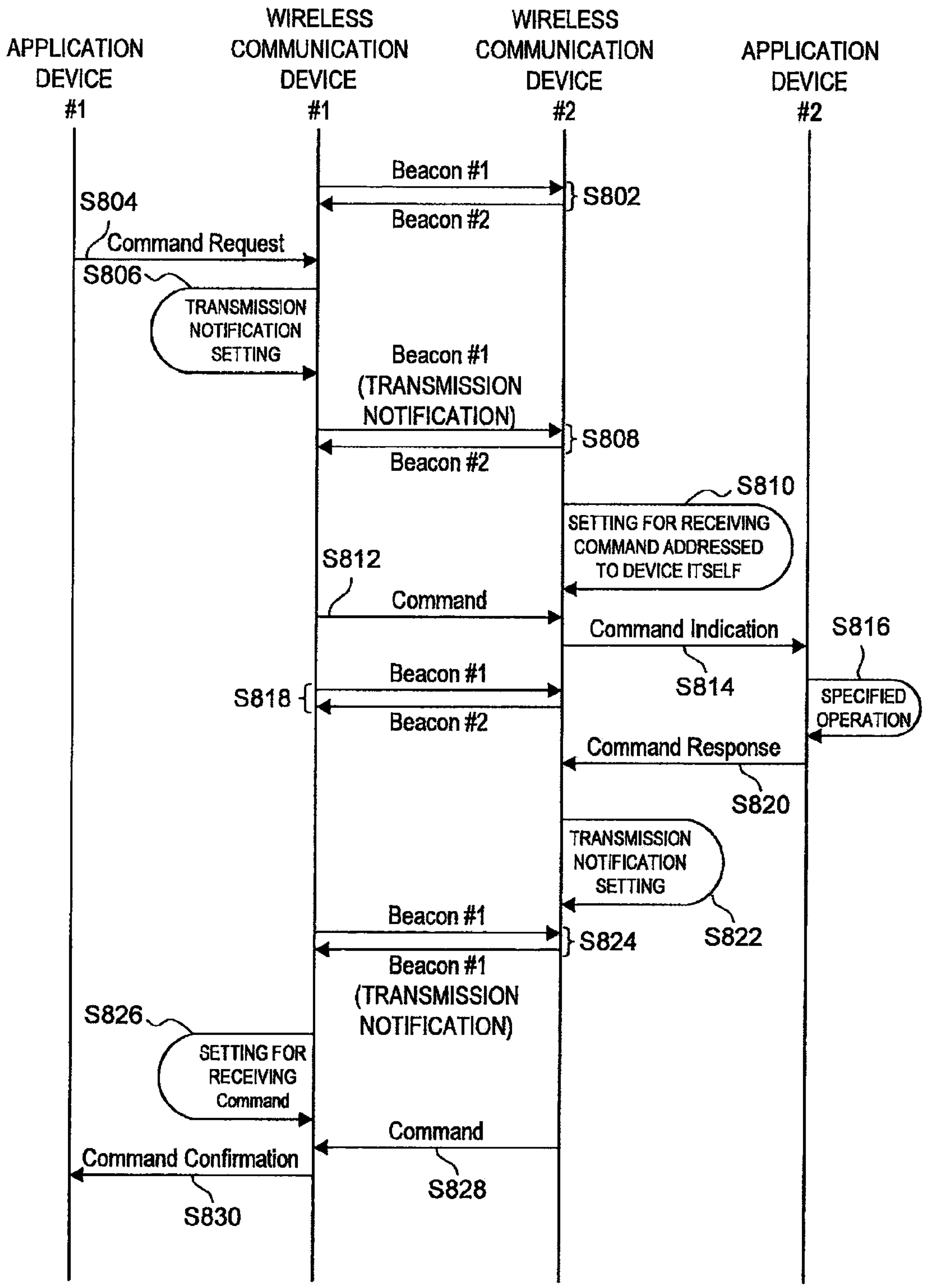
FIG. 8 is a sequence diagram showing the flow of command exchange in a wireless communication system relating to the present embodiment.

FIG. 8 is a sequence diagram showing the flow of command exchange in the wireless communication system relating to the present embodiment. More specifically, FIG. 8 shows a command exchange sequence between, respectively, a wireless communication device #1 and an application device #1 connected thereto, and a wireless communication device #2 and an application device #2 connected thereto.

First, as shown in FIG. 8, the wireless communication devices #1 and #2 exchange beacons at a predetermined super frame cycle to manage the network (step S802). If a command request is transmitted from the application device #1 in this state (step S804), the wireless communication device #1 sets a transmission notification in a beacon using, for example, a traffic indication map information element (TIM IE)(step S806), and transmits the beacon (step S808).

After the wireless communication device #2 has analyzed the beacon received from the wireless communication device #1, if a TIM IE addressed to the device itself is included, the wireless communication device #2 performs reception setting to receive the command at a timing in accordance with the included content (step S810). After that, when the timing arrives, the wireless communication device #1 transmits the command to the wireless communication device #2 (step S812). The wireless communication device #2 supplies the application device #2 with the command received from the wireless communication device #1 as a command indication (step S814), and the application device #2 performs an operation specified by the command (step S816). Note that, during the above process, beacons are exchanged between the wireless communication devices #1 and #2 (step S818).

Then, when a command response is issued from the application device #2 (step S820), the wireless communication device #2 sets the transmission notification in a beacon using, for example, the TIM IE (step S822), and transmits the beacon (step S824). After the wireless communication device #1 has analyzed the beacon received from the wireless communication device #2, if a TIM IE addressed to the device itself is included, the wireless communication device #1 performs reception setting to receive the command at a timing in accordance with the included content (step S826).

After that, when the timing arrives, the wireless communication device #2 transmits the command to the wireless communication device #1 (step S828). The wireless communication device #1 supplies the application device #1 with the command received from the wireless communication device #2 as a command confirmation (step S830). Thus, commands are exchanged between the application devices #1 and #2.

However, if the transmission notification setting and the transmission notification by means of a beacon on the transmission side and the reception setting on the receiving side, like those shown in FIG. 8, are performed for occasionally transmitting commands, it is not effective as described above.

Note that, for actual data transmission, a method has been conceived in which communication by PCA is performed immediately after a beacon period. However, if a plurality of wireless communication devices simultaneously perform communication by PCA, communication collision is liable to occur. Moreover, the length of the beacon period varies depending on an arrangement of each wireless communication device and wireless communication devices in the vicinity. Accordingly, even when the wireless communication device on the transmission side determines that the beacon period has finished, sometimes the wireless communication device on the receiving side determines that it is still the beacon period. Therefore, even when the wireless communication device on the transmission side transmits data immediately after the beacon period has finished, sometimes the wireless communication device on the receiving side determines that it is still the beacon period. In this case, the wireless communication device on the receiving side cannot transmit a data reception response.

The wireless communication device 10 according to the present embodiment has been devised in light of the foregoing circumstances. The wireless communication device 10 according to the present embodiment can transmit operation instruction information such as commands more easily. Hereinafter, the wireless communication device 10 configured as described above will be described in detail with reference to FIG. 9 to FIG. 19.

3. DETAILED DESCRIPTION OF WIRELESS COMMUNICATION DEVICE ACCORDING TO THE PRESENT EMBODIMENT

3-1. Configuration of Wireless Communication Device

Figure 9:
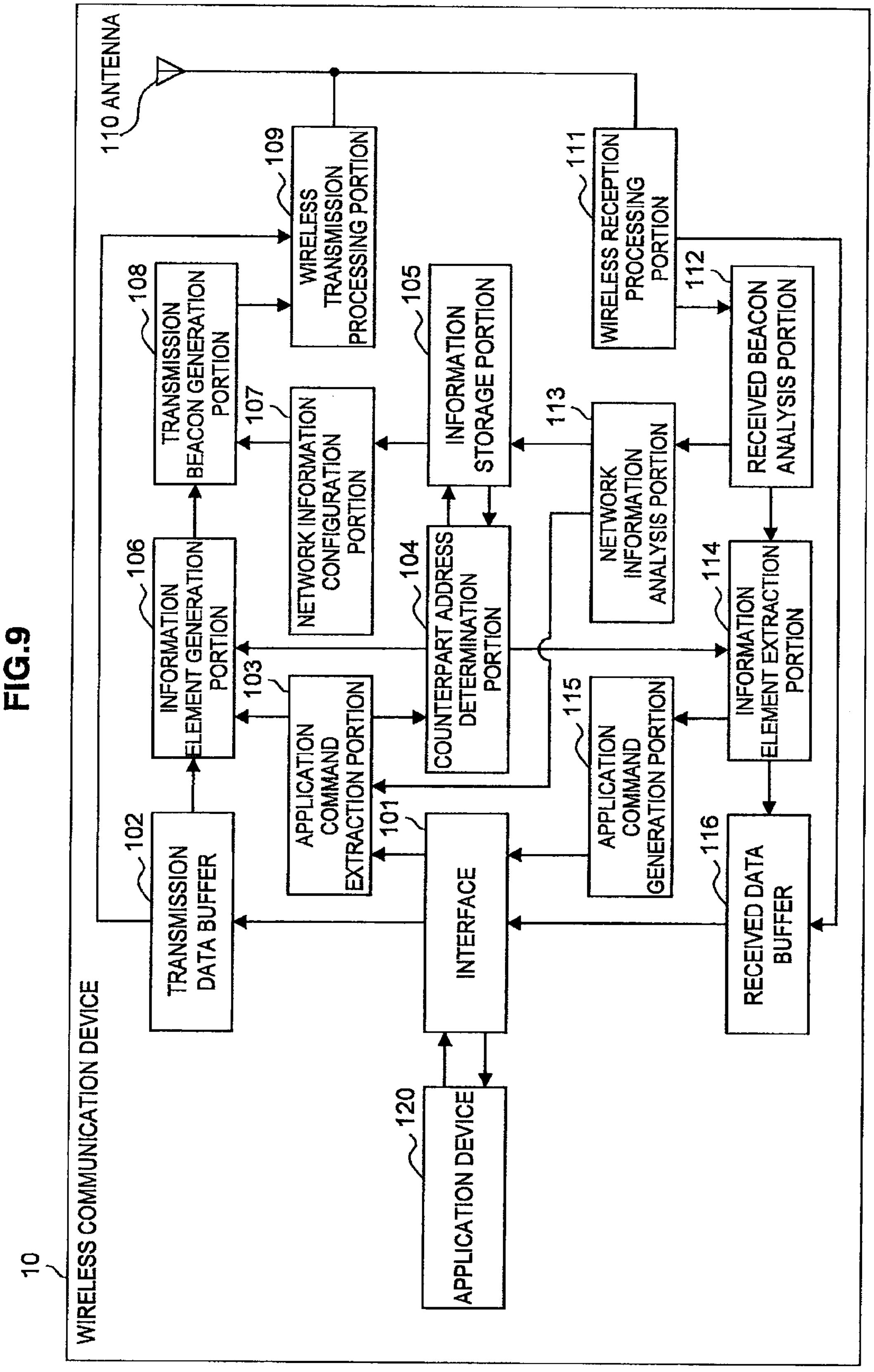
FIG. 9 is a functional block diagram showing the configuration of a wireless communication device according to the present embodiment.

FIG. 9 is a functional block diagram showing the configuration of the wireless communication device 10 according to the present embodiment. As shown in FIG. 9, the wireless communication device 10 includes an interface 101, a transmission data buffer 102, an application command extraction portion 103, a counterpart address determination portion 104, an information storage portion 105, an information element generation portion 106, a network information configuration portion 107, a transmission beacon generation portion 108, a wireless transmission processing portion 109, an antenna 110, a wireless reception processing portion 111, a received beacon analysis portion 112, a network information analysis portion 113, an information element extraction portion 114, an application command generation portion 115, and a received data buffer 116, and is connected to an application device 120.

The interface 101 inputs and outputs given application data from and to the application device 120. For example, the interface 101 inputs application data for transmission and a command (operation instruction information) from the application device 120. Note that examples of the command may include content playback, pause, fast forward, rewind, volume adjustment, selection, and any other instruction. The transmission data buffer 102 temporarily stores the application data for transmission. Further, the interface 101 outputs application data stored in the received data buffer 116 to the application device 120.

The application command extraction portion 103 extracts a command from the application data that has been input to the interface 101 from the application device 120. The counterpart address determination portion 104 determines the destination address of the command extracted by the application command extraction portion 103, based on information about wireless communication devices in the vicinity that is stored in the information storage portion 105. More specifically, the history of past beacon reception by the wireless communication device 10 are recorded in the information storage portion 105.

The information element generation portion 106 inputs a command from the application command extraction portion 103, and functions as a generation portion that generates an information element based on the command. The network information configuration portion 107 functions as a generation portion that generates an information element that is necessary for network management, such as a beacon period occupancy information element (BPO IE). The transmission beacon generation portion 108 generates a beacon including the information elements generated by the information element generation portion 106 and the network information configuration portion 107. In other words, the transmission beacon generation portion 108 according to the present embodiment functions as a generation portion that generates a beacon (management information) to which an information element (operation instruction information) relating to a command is added. Note that the transmission beacon generation portion 108 generates the beacon such that it can be transmitted in a predetermined beacon slot. When a command information element cannot be generated such that the beacon can be transmitted in the predetermined beacon slot, a command frame for transmission in a data transmission region may be generated. Hereinafter, structure examples of the beacon and various information elements added to the beacon will be described with reference to FIG. 10 to FIG. 14.

Structure of each frame and examples of structure of information elements

Figure 10:
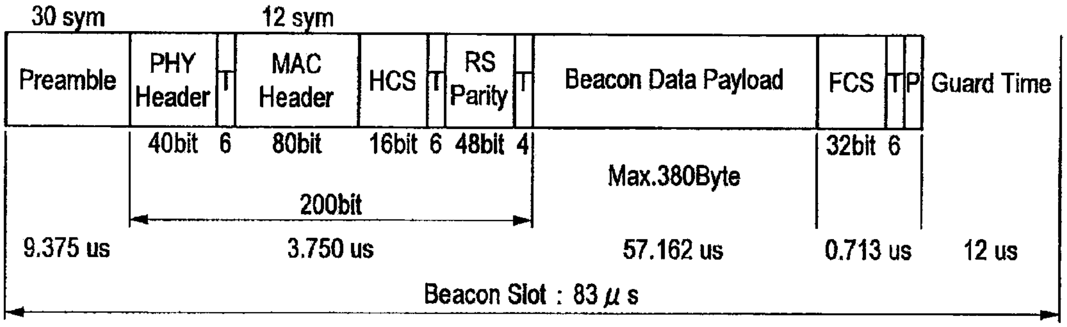
FIG. 10 is an explanatory diagram showing an example of the structure of a beacon.

FIG. 10 is an explanatory diagram showing an example of the structure of a beacon. More specifically, FIG. 10 shows a relationship between the structure of the beacon that is transmitted and received in a beacon slot (83 microseconds), and a maximum frame length.

As shown in FIG. 10, a preamble for 30 symbols (9.375 microseconds), which functions as a synchronization signal, is added to the beacon prior to information. The beacon includes, as header information, a physical layer header (PHY Header: 40 bits), a media access control header (MAC Header: 80 bits), a header check sequence (HCS: 16 bits), a Reed-Solomon encoder parity (RS Parity: 48 bits), and tail bits (T: 6 bits/4 bits) interposed therebetween. Thus, the beacon includes, as the header information, a total of 200 bits for 12 symbols (3.75 microseconds).

Figure 11:
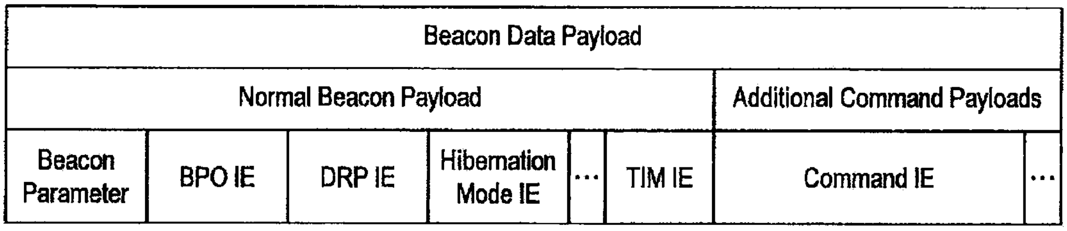
FIG. 11 is an explanatory diagram showing an example of the structure of a beacon data payload.

Further, a total time of 57.162 microseconds, which is obtained by excluding, from the end of the beacon slot, a guard time, a frame check sequence (FCS: 32 bits), a tail bit (T: 6 bits), and a padding (P: 0.713 microseconds) if necessary, can be used for transmission of a beacon data payload having the largest data size. Therefore, it is estimated that an approximately 380 bytes of data can be added as the beacon data payload, FIG. 11 is an explanatory diagram showing an example of the structure of the beacon data payload. As shown in FIG. 11, the beacon data payload includes, as a normal beacon payload, a beacon parameter, and various information elements, such as a beacon period occupancy information element (BPO IE), a distributed reservation protocol information element (DRP IE), a hibernation mode IE, a traffic indication map information element (TIM IE), and the like.

Further, in the present embodiment, a command IE that indicates a command input from the application device 120 is added to the beacon data payload.

Figure 12:
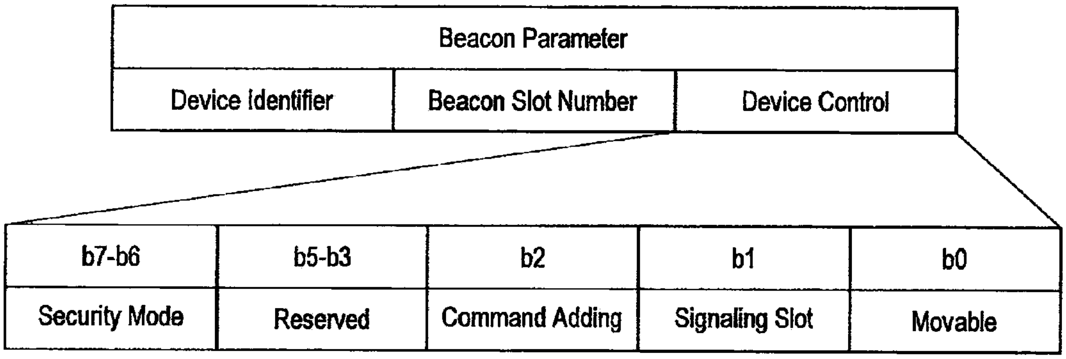
FIG. 12 is an explanatory diagram showing an example of the structure of a beacon parameter.

FIG. 12 is an explanatory diagram showing an example of the structure of the beacon parameter. As shown in FIG. 12, the beacon parameter includes a device identifier, a beacon slot number, and device control information.

The device control information includes a movable specification (Movable), a signaling slot, command additional information (Command Adding information), and a security mode. The Command Adding information is information that indicates whether or not a command information element is included in the beacon data payload. Prior to decoding of the beacon data payload, the wireless communication device 10 can confirm whether or not a command information element is included in the beacon data payload based on the Command Adding information.

FIG. 13A is an explanatory diagram showing an example of the structure of a beacon period occupancy information element (BPO IE). As shown in FIG. 13A, the BPO IE includes an element ID that identifies the element, an information length (Length) that indicates the length of this information element, a beacon period length (BP Length) that indicates the length of the beacon period, a beacon slot information bitmap (Beacon Slot Info Bitmap) that indicates the occupancy state of the beacon slot, and device addresses (DevAddr 1 to DevAddr N) that indicate transmission sources of beacons that have been received.

A beacon reception state of each beacon slot is entered and described in the beacon slot information bitmap. For example, if a beacon is received in a certain beacon slot but an error is detected by both the HCS and FCS, "10" is entered, and a broadcast address (BcstAddr=0xFFFF) is entered as a subsequent device address (DevAddr X). If no error is detected in the HCS and an error is detected in the FCS, "10" and a device address corresponding to the subsequent device address (DevAddr X) are entered. Moreover, both the HCS and FCS are normal, "01" or "11" and a device address corresponding to the subsequent device address (DevAddr X) are entered. When a movable bit of the device control field (FIG. 12) of the received beacon has been set to 1, "11" is entered, and when the bit is 0, "01" is entered. When a preamble portion of a signal is not detected in the beacon slot, "00" is entered, and the subsequent device address (DevAddr X) is not entered.

FIG. 13B is an explanatory diagram showing an example of the structure of the distributed reservation protocol information element (DRP IE). As shown in FIG. 13B, the DRP IE includes an element ID that identifies the element, an information length (Length) that indicates the length of this information element, control information for DRP reservation (DRP Control), a reservation target device address (Target/Owner DevAddr), and DRP allocation position information (DRP Allocation 1 to DRP Allocation N).

FIG. 13C is an explanatory diagram showing an example of the structure of the hibernation mode IE. As shown in FIG. 13C, the hibernation mode IE includes an element ID that identifies the element, an information length (Length) that indicates the length of this information element, a countdown value until a hibernation operation is started (Hibernation Countdown), and a value of a hibernation operation duration (Hibernation Duration).

FIG. 13D is an explanatory diagram showing an example of the structure of a hibernation anchor IE. As shown in FIG. 13D, the hibernation anchor IE includes an element ID that identifies the element, an information length (Length) that indicates the length of this information element, and hibernation mode device information 1 to hibernation mode device information N.

Further, the hibernation mode device information 1 to N includes a device address in the hibernation mode (Hibernation Mode Neighbor DevAddr), and a starting countdown value (Wakeup Countdown).

FIG. 13E is an explanatory diagram showing an example of the structure of the traffic indication map information element (TIM IE). As shown in FIG. 13E, the TIM IE includes an element ID that identifies the element, an information length (Length) that indicates the length of this information element, and addresses of devices presently transmitting (DevAddr 1 to DevAddr N).

Next, specific examples of various command information elements that are added to a beacon in the present embodiment will be described with reference to FIG. 14A to FIG. 14F.

FIG. 14A is an explanatory diagram showing an example of the structure of a mouse command IE. The mouse command IE is generated by the information element generation portion 106 when the application device 120 is a mouse and a command is output from the application device 120.

More specifically, the mouse command IE includes an element ID that identifies the element, an information length (Length) of this information element, an application specific information element (ASIE) specifier ID, a target device address (Target DevAddr), a control parameter, an operation parameter, and an activation cycle.

An address of a control target device of the mouse command IE is described in the Target DevAddr. For example, information relating to button click of the mouse is described in the control parameter. Further, a movement amount of the mouse is described in the operation parameter. Output frequency of the mouse command IE from the mouse, which is the application device 120, and the like are described in the activation cycle. Accordingly, the target device of the mouse command IE can recognize the frequency at which the command information element included in the beacon data payload needs to be decoded, based on the description in the activation cycle.

FIG. 14B is an explanatory diagram showing an example of the structure of a keyboard command IE. The keyboard command IE is generated by the information element generation portion 106 when the application device 120 is a keyboard and a command is output from the application device 120.

More specifically, the keyboard command IE includes an element ID that identifies the element, an information length (Length) of this information element, an application specific information element (ASIE) specifier ID, a target device address (Target DevAddr), a keyboard parameter, and an activation cycle. The keyboard parameter is a parameter that indicates a key operation on the keyboard, which is the application device 120. A receiving side device of the keyboard command IE can operate based on the parameter described in the keyboard parameter.

FIG. 14C is an explanatory diagram showing an example of the structure of a remote controller command IE. The remote controller command IE is generated by the information element generation portion 106 when the application device 120 is a remote controller and a command is output from the application device 120.

More specifically, the remote controller command IE includes an element ID that identifies the element, an information length (Length) of this information element, an application specific information element (ASIE) specifier ID, a target device address (Target DevAddr), a command code, and an activation cycle. The command code is a parameter that indicates the content instructed by a user who operates the remote controller, which is the application device 120.

FIG. 14D is an explanatory diagram showing an example of the structure of a terminal command IE. The terminal command IE is generated by the information element generation portion 106 when the application device 120 is an information terminal and a command is output from the application device 120.

More specifically, the terminal command IE includes an element ID that identifies the element, an information length (Length) of this information element, an application specific information element (ASIE) specifier ID, a target device address (Target DevAddr), an information length (Length) of a subsequent terminal control code, and the terminal control code.

FIG. 14E is an explanatory diagram showing an example of the structure of a game controller command IE. The game controller command IE is generated by the information element generation portion 106 when the application device 120 is a controller of a game console and a command is output from the application device 120.

More specifically, the game controller command IE includes an element ID that identifies the element, an information length (Length) of this information element, an application specific information element (ASIE) specifier ID, a target device address (Target DevAddr), and a game control code. The game control code is a code that indicates the details of a user's operation of the application device 120, which is a controller. A game being run on a game device on the receiving side of the game controller command IE progresses based on the game control code.

FIG. 14F is an explanatory diagram showing an example of the structure of an equipment controller command IE. The equipment controller command IE is generated by the information element generation portion 106 when the application device 120 is a controller of a household electrical appliance and a command is output from the application device 120.

More specifically, the equipment controller command IE includes an element ID that identifies the element, an information length (Length) of this information element, an application specific information element (ASIE) specifier ID, a target device address (Target DevAddr), and an equipment control code. The equipment control code is a code that indicates the details of the user's operation of the application device 120, which is a controller. A household electrical appliance on the receiving side of the equipment controller command IE can control its state based on the equipment control code.

The configuration of the wireless communication device 10 will be described again with reference to FIG. 9. The wireless transmission processing portion 109 performs signal processing of a beacon including a command information element generated by the transmission beacon generation portion 108 in a predetermined beacon slot, and converts the beacon to a high frequency signal. Further, the wireless transmission processing portion 109 performs signal processing of application data stored in the transmission data buffer 102 in a predetermined slot, and converts the application data to a high frequency signal.

The antenna 110 acts as an interface with wireless communication devices in the vicinity, and functions as a transmission portion, a receiving portion, or a communication portion that transmits and receives a beacon or application data to and from the wireless communication devices in the vicinity. The wireless reception processing portion 111 performs signal processing of a high frequency signal received by the antenna 110, and decodes a beacon or application data.

The received beacon analysis portion 112 analyzes information included in the beacon decoded by the wireless reception processing portion 111. For example, the received beacon analysis portion 112 functions as a detection portion that detects whether there is an error in the beacon, based on the HCS and the FCS included in the beacon.

The network information analysis portion 113 (determination portion) identifies wireless communication devices present in the vicinity based on the information described in a beacon. For example, the network information analysis portion 113 confirms the BPO IE, and thereby obtains information on which beacon slot is used to transmit a beacon by each wireless communication device in the vicinity.

Here, it is assumed that the wireless communication device 10 transmits a beacon, to which a command information element that targets a particular wireless communication device has been added, in a particular beacon slot. In response to this, the particular wireless communication device transmits a beacon including the BPO IE that describes whether or not the beacon has been received properly in the particular beacon slot.

Accordingly, the network information analysis portion 113 can determine, based on the BPO IE received from the particular wireless communication device, whether or not the particular wireless communication device has properly received the beacon transmitted from the wireless communication device 10. When the network information analysis portion 113 determines that the beacon transmitted from the wireless communication device 10 has not been received properly, it causes the application command extraction portion 103 to re-transmit the beacon including the command information element.

In this manner, the network information analysis portion 113 can determine, based on the description of the BPO IE, whether or not the beacon has been received properly. Therefore, commands can be communicated reliably without requiring the return of an acknowledgement (ACK) of the beacon's reception.

The information element extraction portion 114 extracts a command information element addressed to the device itself, from the command information elements included in the beacon data payload. The application command generation portion 115 generates a command for the application device 120 based on the parameters and code described in the command information element extracted by the information element extraction portion 114. The command is output to the application device 120 via the interface 101. The application data received by the wireless reception processing portion 111 is stored in the received data buffer 116, and thereafter output to the application device 120 via the interface 101.

3-2. Operation of Wireless Communication Device

The configuration of the wireless communication device 10 according to the present embodiment has been described above with reference to FIG. 9 to FIG. 14. Next, the operation flow of the wireless communication device 10 according to the present embodiment will be described with reference to FIG. 15 to FIG. 19.

Figure 15:
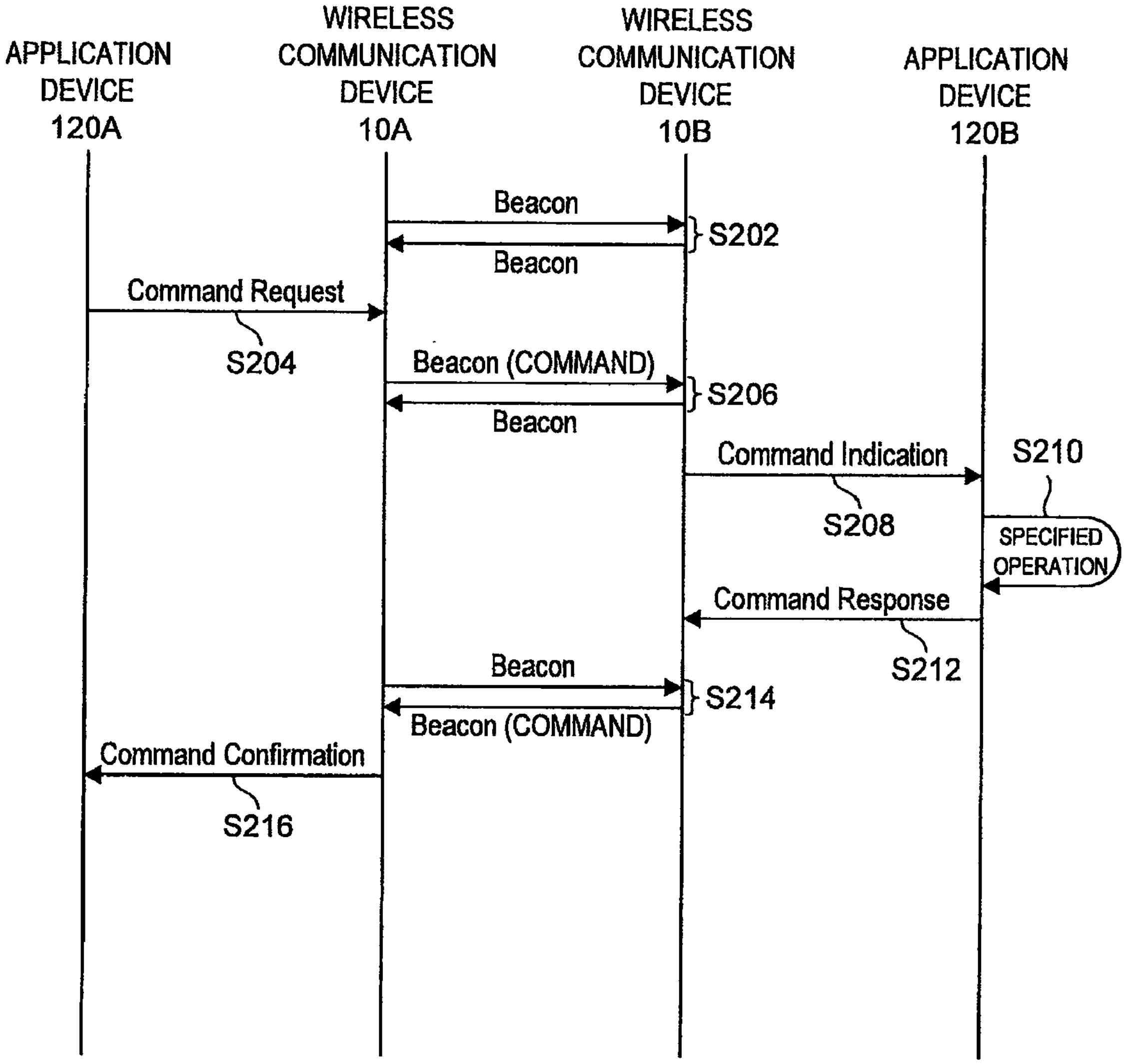
FIG. 15 is a sequence diagram showing the entire flow of the operation of the wireless communication system according to the present embodiment.

FIG. 15 is a sequence diagram showing the entire flow of the operation of the wireless communication system according to the present embodiment. More specifically, FIG. 15 shows a command exchange sequence between, respectively, the wireless communication device 10A and an application device 120A connected thereto, and the wireless communication device 10B and an application device 120B connected thereto.

First, as shown in FIG. 15, the wireless communication devices 10A and 10B exchange beacons at a predetermined super frame cycle to manage the network (step S202). If a command request is issued from the application device 120A (step S204), the wireless communication device 10A adds to a beacon a command information element indicating the command, and transmits the beacon (step S206).

The wireless communication device 10B analyzes the beacon received from the wireless communication device 10A. Then, if a command information element addressed to the device itself is included, the wireless communication device 10B supplies the command to the application device 120B as a command indication (step S208). The application device 120B performs an operation specified by the command (step S210).

After that, when a command response is sent from the application device 120B (step S212), the wireless communication device 10B adds to a beacon the command information element, and transmits the beacon (step S214). The wireless communication device 10A analyzes the beacon received from the wireless communication device 10B. Then, if a command information element addressed to the device itself is included, the wireless communication device 10A supplies the command to the application device 120A as a command confirmation (step S216).

The wireless communication system according to the present embodiment provides the following advantages, in comparison with the wireless communication system related to the embodiment shown in FIG. 8.

(1) The time required for commands to arrive from the application device 120A on one side to the application device 120B on the other side can be shortened.

(2) A communication reservation procedure in the data transmission region for command exchange can be simplified.

(3) A communication band for data other than commands can be secured in the data transmission region.

Figure 16:
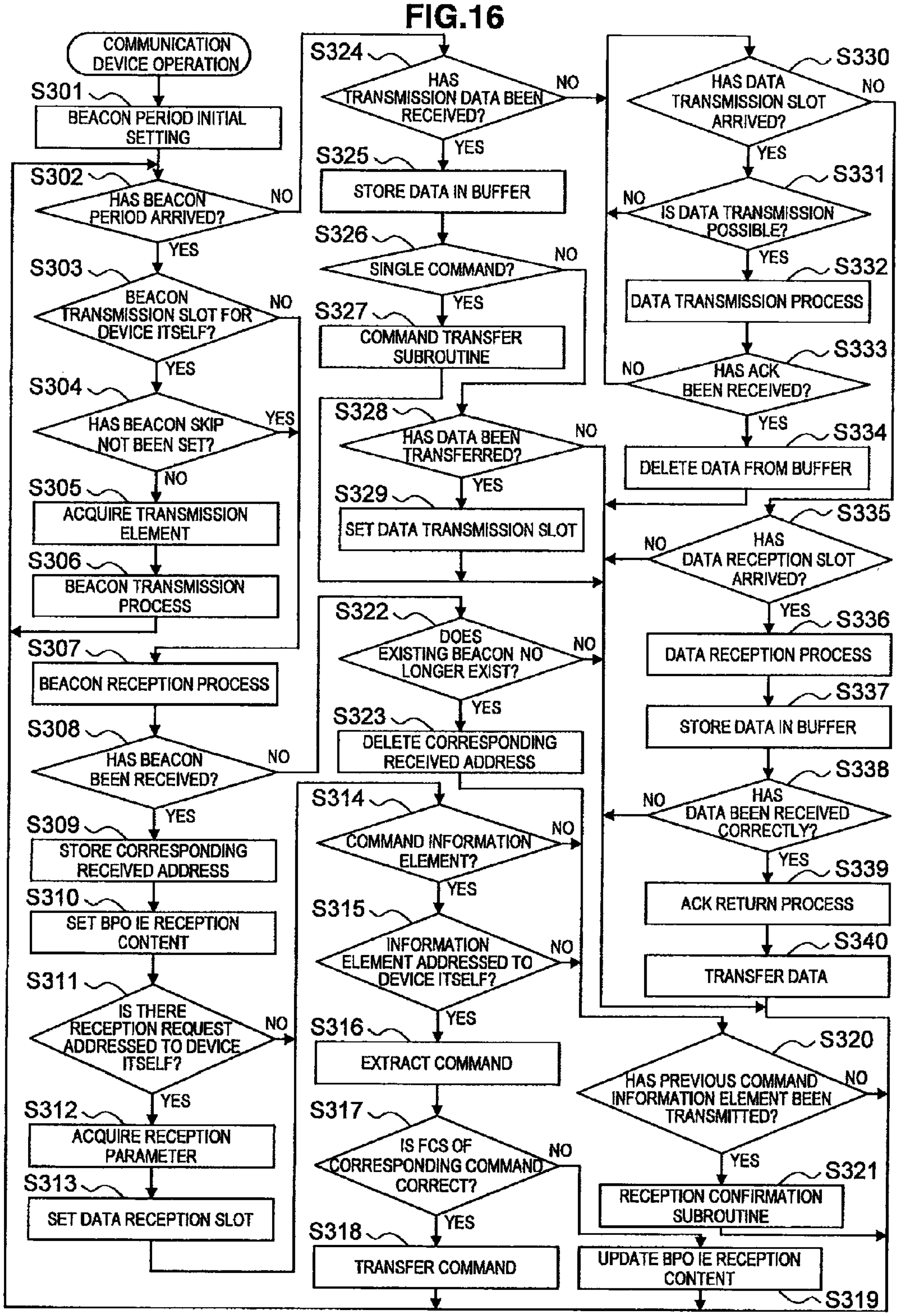
FIG. 16 is a flowchart showing the operation flow of the wireless communication device according to the present embodiment.

FIG. 16 is a flowchart showing the operation flow of the wireless communication device 10 according to the present embodiment. As shown in FIG. 16, after a power source is turned on, the wireless communication device 10 first performs initial setting of a beacon period with wireless communication devices present in the vicinity (step S301). When a beacon period has arrived (step S302) and a transmission slot for its beacon has arrived (step S303), the wireless communication device 10 confirms in a super frame of the transmission slot whether or not beacon skip has been set (step S304). When the beacon skip has not been set, the wireless communication device 10 acquires an information element to be transmitted (step S305), and performs a beacon transmission process (step S306).

On the other hand, during a time period other than the beacon slot for the device itself, or when the beacon skip has been set, the wireless communication device 10 performs a beacon reception process (step S307). When a beacon has been received (step S308), the wireless communication device 10 stores a corresponding received address in the information storage portion 105 (step S309), and sets the reception state in the BPO IE to be added to the next beacon (step S310).

Then, if the beacon includes a reception request in its DRP IE or TIM IE addressed to the device itself (step S311), the wireless communication device 10 acquires a parameter such as a reception slot position (step S312), and sets a reception slot (MAS) for receiving data (step S313).

Further, when a command information element addressed to the device itself has been added to the beacon (steps S314 and S315), the information element extraction portion 114 of the wireless communication device 10 extracts the parameter and code described in the command information element (step S316). When the value of the FCS of the beacon is correct (step S317), the application command generation portion 115 outputs a command to the application device 120 via the interface 101 (step S318).

On the other hand, when the value of the FCS is not correct, it is considered that the transmitted command information element has not been received properly. Therefore, the network information configuration portion 107 changes the value of a counterpart device corresponding to the BPO IE to be transmitted next (step S319). Further, when the wireless communication device 10 has transmitted a command information element in the previous cycle (step S320), the process proceeds to a reception confirmation subroutine in order to confirm whether or not the command has been properly received by the counterpart device (step S321).

When an existing beacon is not received over a predetermined number of super frames, and it is determined that the beacon no longer exists (step S322), the wireless communication device 10 deletes the corresponding received address from the information storage portion 105 (step S323). Then, the process returns to step S302 and the beacon reception process is continued as long as a beacon period continues.

When the wireless communication device 10 has received application data or information such as a command from the application device 120 during a time period other than a beacon period (step S324), it stores the application data in the transmission data buffer 102 (step S325). Further, if the command is a single command (step S326), the command is transferred through a command transfer subroutine (step S327).

When the application data has been received (step S328), the wireless communication device 10 sets the TIM IE and the DRP IE, and sets a transmission slot of the application data for a counterpart communication device according to a predetermined procedure (step S329). When the data transmission slot has arrived (step S330), if transmission of the application data is possible (step S331), the wireless communication device 10 performs a data transmission process (step S332). If the slot is a DRP reserved slot, the application data can be immediately transmitted. However, if the application data is transmitted using PCA, it is determined whether or not data transmission is possible after performing a prescribed prior reception.

Further, when an ACK has been received after transmitting the application data (step S333), the wireless communication device 10 deletes the transmitted application data from the transmission data buffer 102 (step S334). On the other hand, when the ACK has not been received, the wireless communication device 10 returns to the process at step S330, and transmits the application data again.

When the data reception slot is reached (step S335), the wireless communication device 10 performs a data reception process (step S336), and stores the received data in the received data buffer 116 (step S337). Then, if the data is received correctly (step S338), the wireless communication device 10 sends back the ACK (step S339), and outputs to the application device 120 the data stored in the received data buffer 116 (step S340). When a series of data transmission and reception processes have been completed, or when a slot (MAS) for which transmission/reception setting has not been performed is reached, the wireless communication device 10 returns to the process at step S302 without performing any processing, and repeats a series of operations.

Figure 17:
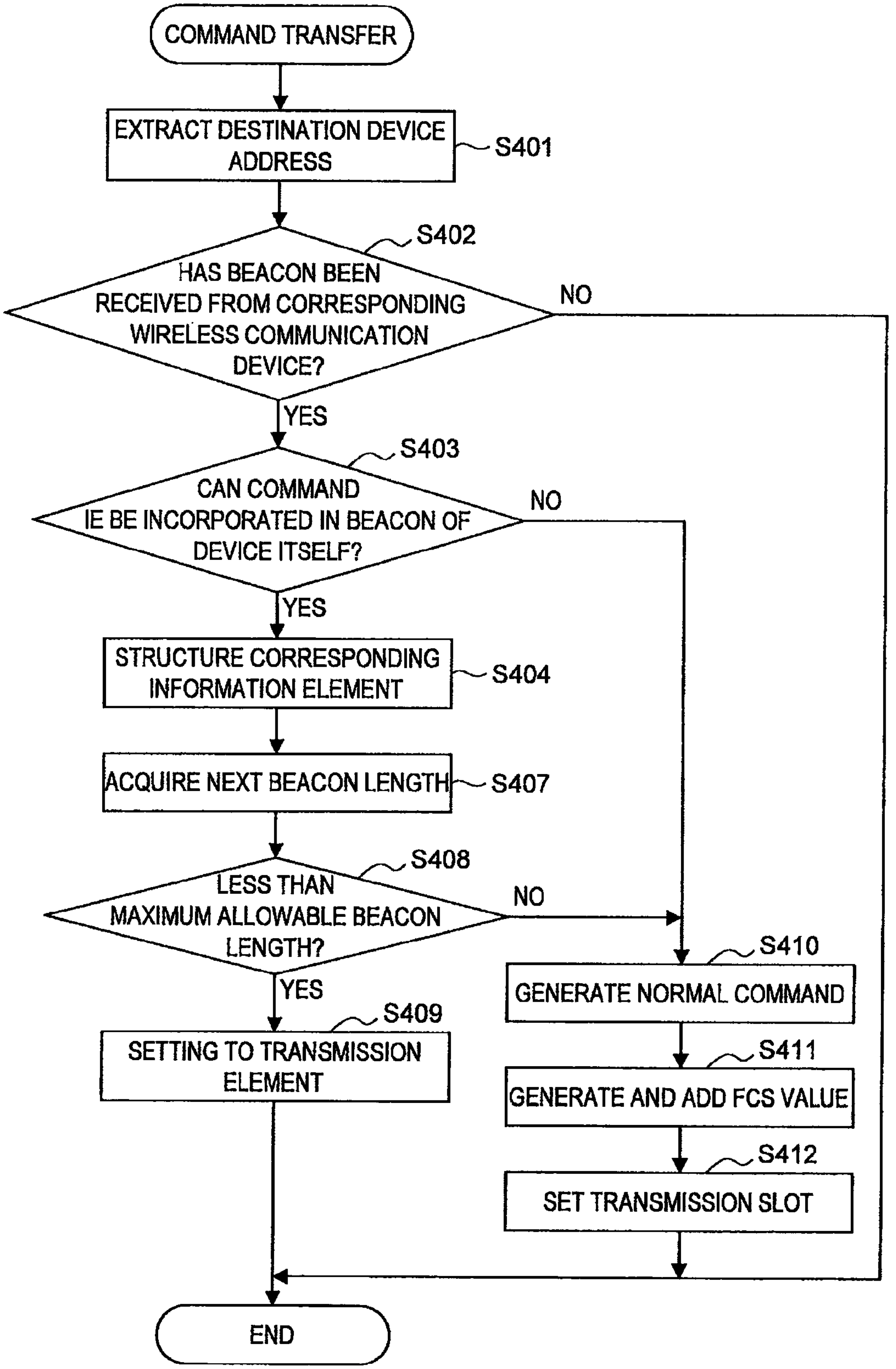
FIG. 17 is a flowchart showing the flow of a command transfer process.

FIG. 17 is a flowchart showing the flow of a command transfer process. First, as shown in FIG. 17, the wireless communication device 10 identifies, based on the address of an application device (destination device), the wireless communication device connected to the application device (step S401). When a beacon has been received from the extracted wireless communication device (step S402), and when a command information element can be incorporated in a beacon of the device itself (step S403), the wireless communication device 10 generates a corresponding command information element (step S404).

Further, the transmission beacon generation portion 108 obtains the length of the next beacon (step S407). If the length of the beacon does not exceed a maximum allowable beacon length even when the command information element is added (step S408), the transmission beacon generation portion 108 performs transmission setting for the command information element (step S409).

On the other hand, when the command information element cannot be incorporated, or when the maximum allowable beacon length is exceeded, the wireless communication device 10 generates a normal command (step S410). Further, the wireless communication device 10 calculates a frame check sequence (FCS) and adds it to the command generated at step S410 (step S411). In addition, the wireless communication device 10 sets a slot for transmitting the command (step S412). When a corresponding wireless communication device does not exist, the series of operations of the command transfer process is completed without performing the above setting.

Figure 18:
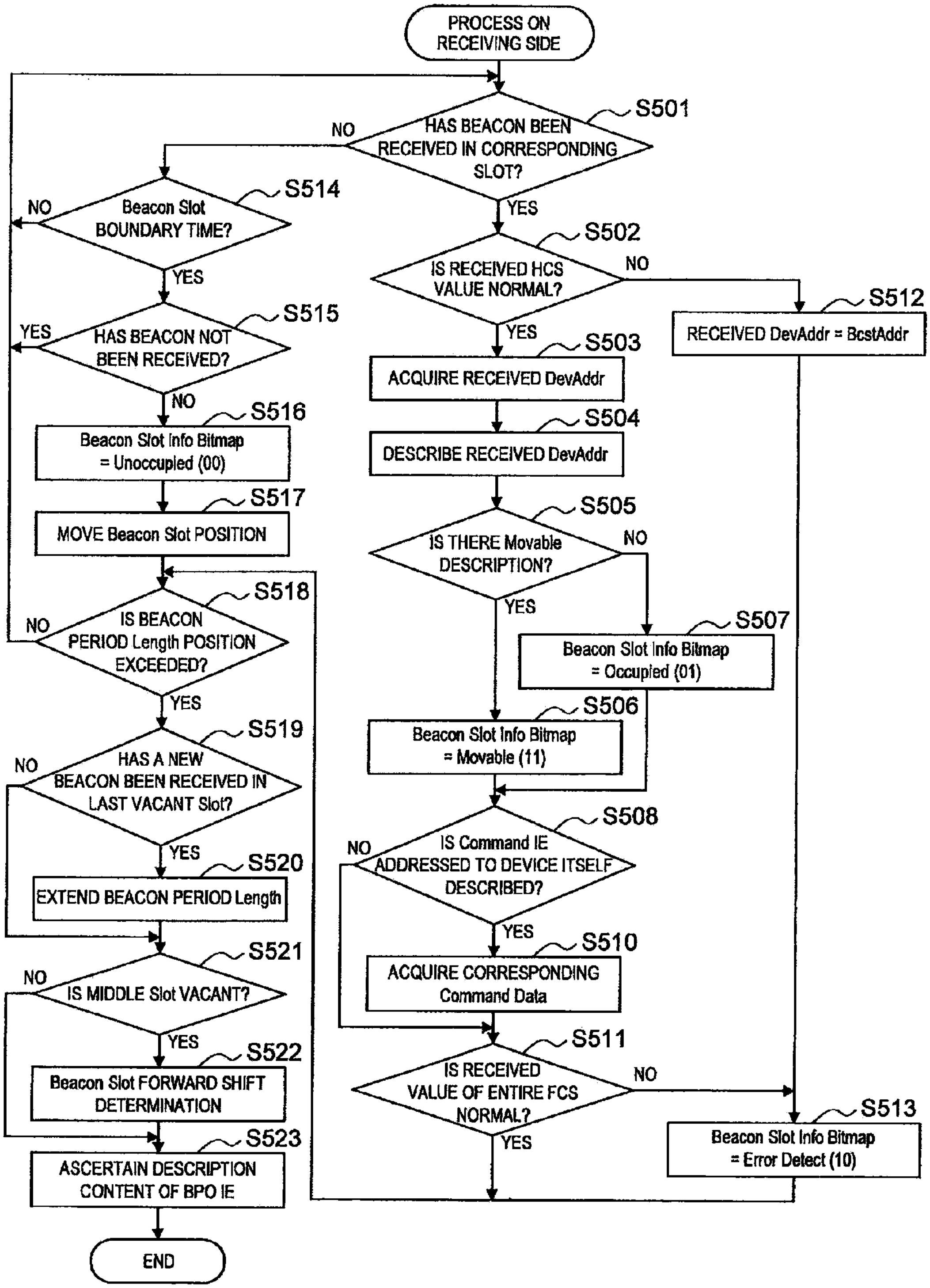
FIG. 18 is a flowchart showing the flow of a reception process performed by the wireless communication device.

FIG. 18 is a flowchart showing the flow of a reception process performed by the wireless communication device 10. More specifically, FIG. 18 shows the flow of a process that enters the reception result of beacons in a beacon period, as a parameter relating to the BPO IE of the beacon to be transmitted next from the device itself.

First, when the wireless communication device 10 receives a beacon in a given beacon slot (step S501), if the received value of the header check sequence (HCS) is normal (step S502), the wireless communication device 10 acquires the address information (DevAddr) described in the header (step S503). The network information configuration portion 107 of the wireless communication device 10 enters the acquired address information in the DevAddr field of the BPO IE (step S504).

When a movable bit is described, i.e., "bit=1" in the device control field (FIG. 12) of the beacon parameter of the received beacon (step S505), a bit of a corresponding beacon slot occupancy state is set to (11) that indicates the movable specification (step S506). On the other hand, when the movable bit is not described, i.e., "bit=0", the bit is set to (01) that indicates a normal occupied state (step S507).

When a command information element addressed to the device itself is described (step S508), the wireless communication device 10 acquires data information of the command (step S510), and outputs it to the application device 120. If the value of the entire frame check sequence (FCS) is correct (step S511), then the wireless communication device 10 proceeds to step S518.

Meanwhile, if an error is detected in the HCS, the DevAddr described in the header may not be correct. In this case, the network information configuration portion 107 enters a broadcast address (BcstAddr) in the DevAddr field of the BPO IE (step S512). When an error is detected both in the HCS and the FCS, the bit of a corresponding beacon slot occupancy state is set to (10) that indicates error detection (step S513). Thereafter, the process proceeds to step S518.

When a beacon slot boundary timing has been reached (step S514) and a beacon has not been received in the beacon slot (step S515), the bit of the corresponding beacon slot occupancy state is set to (00) that indicates an unoccupied state (step S516). Further, the wireless communication device 10 moves a beacon slot position (step S517). The above-described reception process in a beacon period is repeated until a beacon period length position is exceeded (step S518).

When the beacon period length is exceeded, if a new beacon has been received in the last vacant slot (step S519), the wireless communication device 10 extends the beacon period length for the device itself (step S520). Alternatively, if a middle slot is vacant (step S521), the wireless communication device 10 makes a beacon slot forward shift determination, and if necessary, the wireless communication device 10 shifts the beacon slot for the device itself to a forward vacant slot (step S522). The wireless communication device 10 ascertains the content described in the next BPO IE in this manner (step S523), and completes a series of reception operations.

Figure 19:
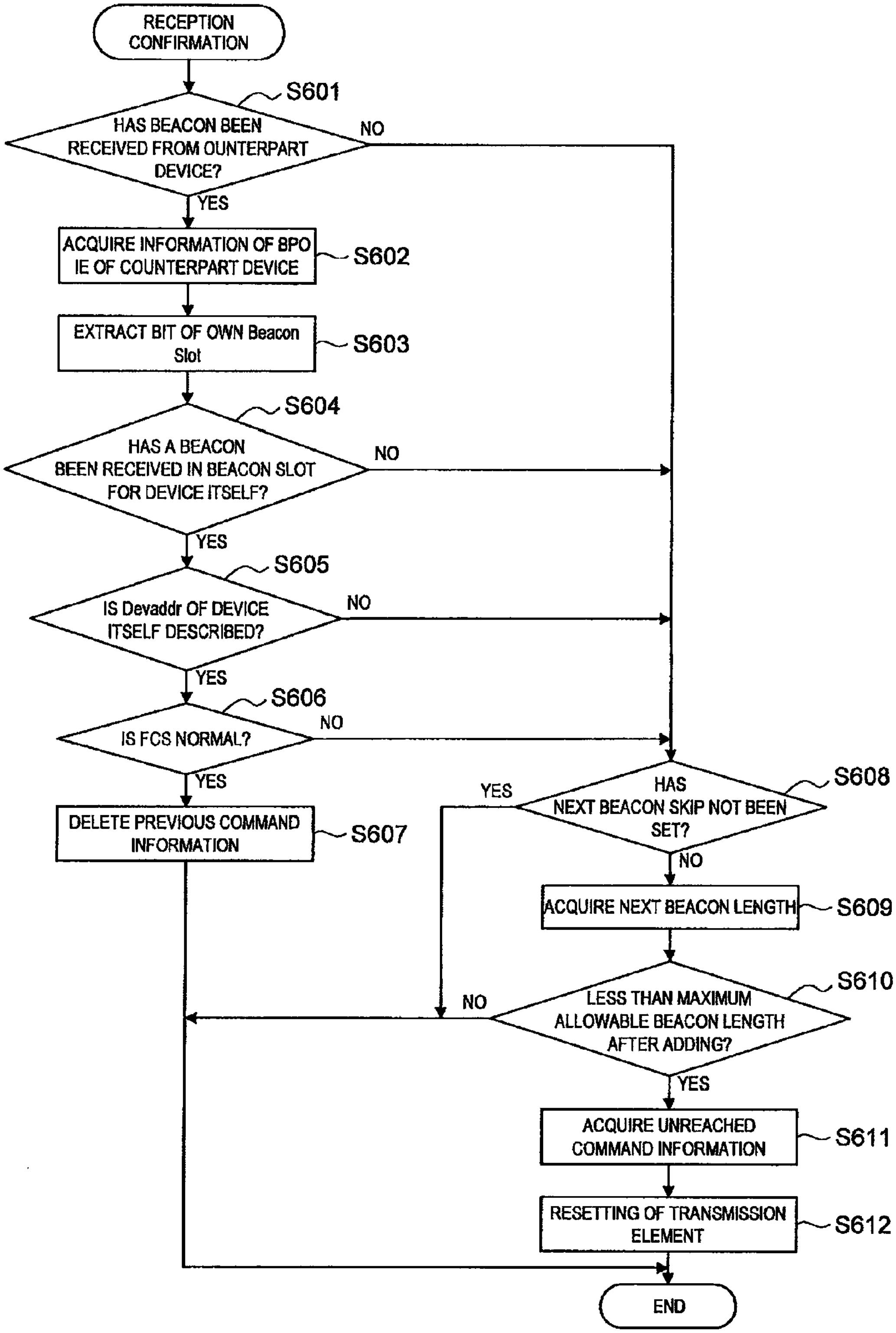
FIG. 19 is a flowchart showing the flow of a reception confirmation process.

FIG. 19 is a flowchart showing the flow of a reception confirmation process. When the network information analysis portion 113 has received a beacon from a counterpart communication device (step S601), it acquires the information of the BPO IE included in the received beacon (step S602). Further, the network information analysis portion 113 extracts, from the BPO IE, the bit of a beacon slot occupancy state corresponding to the beacon slot position of the device itself (step S603).

Then, the network information analysis portion 113 confirms whether there is a description indicating reception in the beacon slot for the device itself (step S604) and whether the DevAddr of the device itself is described (step S605). Further, if the frame check sequence (FCS) of the beacon is received normally (step S606), it is considered that the command has correctly reached the counterpart communication device. Therefore, the wireless communication device 10 deletes the transmitted command information (step S607).

On the other hand, when a beacon has not been received from the counterpart communication device, when there is no description indicating reception in the beacon slot for the device itself, when the DevAddr of the device itself is not described, or when an FCS error is detected, the wireless communication device 10 needs to retransmit the command. Accordingly, in these cases, if there is no setting to skip the next beacon transmission (step S608), the wireless communication device 10 acquires the length of the next beacon (step S609). Then, when the maximum allowable beacon length is not exceeded (step S610), the wireless communication device 10 acquires the command that has not been properly received (step S611), and sets retransmission of the command information element relating to the command (step S612).

4. CONCLUSION

As described above, according to the present embodiment, a short command can be easily exchanged in a wideband wireless communication system by adding the command, as a command information element, to a beacon and transmitting the beacon. Further, it is possible to easily exchange a short command using only the wideband wireless communication system, without using a narrow band wireless communication system. Accordingly, a wireless communication function provided in the wireless communication device 10 can be integrated. This is advantageous when an antenna is disposed inside a case of the wireless communication device 10 because there is no need to provide antennas corresponding to separate wireless communication functions. Instead, it is sufficient to provide an antenna for the wideband wireless communication system.

Further, the possibility that the communication of the wireless communications devices 10 will interfere with each other can be reduced by using a beacon slot that is individually set to be used by each wireless communication device 10. Further, because the beacon slot can be used for each super frame cycle, an information element of a command can be immediately generated, and the command can be exchange in a short time.

Further, if the destination address is clearly described in a command information element, other wireless communication devices can interrupt the process of the corresponding command. Further, if an information element that indicates the beacon reception state in the previous super frame is used, command reception confirmation can be easily performed without sending back an ACK (reception confirmation). As a result, the wireless communication device 10 that has transmitted the command can perform retransmission control without having to receive the ACK (reception confirmation) from the receiving side device.

Moreover, if the command information element is added such that a predetermined beacon slot is not exceeded, beacon frames can be structured such that the timing of the adjacent beacon slot position is not exceeded. Further, when the command information element cannot be added to a beacon, it is also possible to generate a command frame in the same manner as in normal data transmission, and transmits the command frame individually to a counterpart communication device.

It should be understood by those skilled in the art that various modifications, combinations, sub-combinations and alterations may occur depending on design requirements and other factors insofar as they are within the scope of the appended claims or the equivalents thereof.

For example, each step of the processing performed by the wireless communication device 10 of this specification does not have to be performed in a time series in line with the order described in the sequence diagram or the flow charts. For example, each step of the processing performed by the wireless communication device 10 may include processing that is performed in parallel or individually (for example, parallel processing or object oriented processing).

Note that, a computer program can also be created that causes hardware such as a CPU, a ROM, and a RAM that are built-in to the wireless communication device 10 to perform functions that are the same as each structural element of the above-described wireless communication device 10. A storage medium that stores the computer program is also provided. If each function block shown by the functional block diagram in FIG. 9 is structured by hardware, a series of processing can be realized by hardware.

The present application contains subject matter related to that disclosed in Japanese Priority Patent Application JP 2008-133775 filed in the Japan Patent Office on May 22, 2008, the entire content of which is hereby incorporated by reference.

What is claimed is:

1. A wireless communication device comprising:

a management information generation portion that generates a plurality of management information signals, wherein the plurality of management information signals are periodically transmitted to neighboring wireless communication devices located in a vicinity of the wireless communication device for forming a wireless network;

a data information generation portion that generates data information, wherein the data information is for transferring data to one or more of the neighboring wireless communication devices and wherein the data information are distinct from, and are transmitted separately from, the sequence of management information signals;

an operation instruction generation portion that generates an operation instruction aimed at a neighbor wireless communication device of the neighboring wireless communication devices;

an incorporation determination portion that makes an incorporation determination as to whether the operation instruction can be incorporated in a subsequent management information signal of the plurality of management information signals;

an incorporation portion that incorporates the operation instruction in the subsequent management information signal, if the incorporation determination indicates that the operation instruction can be incorporated in the subsequent management information signal; and a communication portion that transmits, to the neighbor wireless communication device the subsequent management information signal.

2. The wireless communication device according to claim 1, wherein the communication portion receives from the neighbor wireless communication device a received management information signal, and the wireless communication device further comprises:

a reception confirmation detection portion that performs a reception confirmation detection based on information in the received management information signal as to whether the operation instruction has been correctly received by the neighbor wireless communication device, and wherein when the reception confirmation detection indicates that the operation instruction has not been correctly received by the neighbor wireless communication device, the incorporation portion incorporates the operation instruction in a second subsequent management information signal and the communication portion transmits to the neighbor wireless communication device the second subsequent management information signal.

3. The wireless communication device according to claim 2, wherein the operation instruction generation portion stores the operation instruction for later incorporation, and wherein when the reception confirmation detection indicates that the operation instruction has been correctly received by the neighbor wireless communication device, the operation instruction generation portion deletes the stored operation instruction.

4. The wireless communication device according to claim 1, wherein the operation instruction includes identification information of the neighbor wireless communication device.

5. The wireless communication device according to claim 1, wherein an upper limit is set on an amount of information that is allowed to be added to the subsequent management information signal, and the incorporation determination indicates that the operation instruction can be incorporated in the subsequent management information signal if a sized of the subsequent information signal after incorporation does not exceed the upper limit.

6. The wireless communication device according to claim 1, wherein, if the incorporation determination indicates that the operation instruction cannot be incorporated in the subsequent management information signal, the incorporation portion incorporates the operation instruction in a subsequent data information signal including data information, and the a communication portion transmits, to the neighbor wireless communication device, the subsequent data information signal.

7. The wireless communication device according to claim 1, wherein the a plurality of management information signals are a sequence of beacon signals.

8. The wireless communication device according to claim 1, wherein the data information and the plurality of management information signals are incorporated in a plurality of super frames.

9. The wireless communication device according to claim 1, wherein the operation instruction includes a command aimed at the neighbor wireless communication device.

10. A non-transitory computer medium encoded with a computer program, wherein the computer program, when executed by computer, causes the computer to function as a system comprising:

a management information generation portion that generates a plurality of management information signals, wherein the plurality of management information signals are periodically transmitted to neighboring wireless communication devices located in a vicinity of the wireless communication device for forming a wireless network;

a data information generation portion that generates data information, wherein the data information is for transferring data to one or more of the neighboring wireless communication devices and wherein the data information are distinct from, and are transmitted separately from, the sequence of management information signals;

an operation instruction generation portion that generates an operation instruction aimed at a neighbor wireless communication device of the neighboring wireless communication devices;

an incorporation determination portion that makes an incorporation determination as to whether the operation instruction can be incorporated in a subsequent management information signal of the plurality of management information signals;

an incorporation portion that incorporates the operation instruction in the subsequent management information signal, if the incorporation determination indicates that the operation instruction can be incorporated in the subsequent management information signal; and a communication portion that transmits, to the neighbor wireless communication device the subsequent management information signal.

11. A wireless communication method performed by a wireless communication device, the method comprising:

generating, via a management information generation portion, a plurality of management information signals, wherein the plurality of management information signals are periodically transmitted to neighboring wireless communication devices located in a vicinity of the wireless communication device for forming a wireless network;

generating data information via a data information generation portion, wherein the data information is for transferring data to one or more of the neighboring wireless communication devices and wherein the data information are distinct from, and are transmitted separately from, the sequence of management information signals;

generating, via an operation instruction generation portion, an operation instruction aimed at a neighbor wireless communication device of the neighboring wireless communication devices;

making an incorporation determination, via an incorporation determination portion, as to whether the operation instruction can be incorporated in a subsequent management information signal of the plurality of management information signals;

incorporating, via an incorporation portion, the operation instruction in the subsequent management information signal, if the incorporation determination indicates that the operation instruction can be incorporated in the subsequent management information signal; and transmitting, via a communication portion, to the neighbor wireless communication device the subsequent management information signal.

12. The wireless communication method according to claim 11, further comprising:

receiving from the neighbor wireless communication device a received management information signal;

performing a reception confirmation detection based on information in the received management information signal as to whether the operation instruction has been correctly received by the neighbor wireless communication device; and when the reception confirmation detection indicates that the operation instruction has not been correctly received by the neighbor wireless communication device, incorporating the operation instruction in a second subsequent management information signal and transmitting to the neighbor wireless communication device the second subsequent management information signal.

13. The wireless communication method according to claim 12, further comprising:

storing the operation instruction for later incorporation; and when the reception confirmation detection indicates that the operation instruction has been correctly received by the neighbor wireless communication device, deleting the stored operation instruction.

14. The wireless communication method according to claim 11, wherein the operation instruction includes identification information of the neighbor wireless communication device.

15. The wireless communication method according to claim 11, wherein an upper limit is set on an amount of information that is allowed to be added to the subsequent management information signal, and the incorporation determination indicates that the operation instruction can be incorporated in the subsequent management information signal if a sized of the subsequent information signal after incorporation does not exceed the upper limit.

16. The wireless communication method according to claim 11, wherein if the incorporation determination indicates that the operation instruction cannot be incorporated in the subsequent management information signal, the method further comprising:

incorporating the operation instruction in a subsequent data information signal including data information; and transmitting to the neighbor wireless communication device the subsequent data information signal.

17. The wireless communication method according to claim 11, wherein the a plurality of management information signals are a sequence of beacon signals.

18. The wireless communication method according to claim 11, wherein the data information and the plurality of management information signals are incorporated in a plurality of super frames.

19. The wireless communication method according to claim 11, wherein the operation instruction includes a command aimed at the neighbor wireless communication device.

20. A wireless communication system comprising:

a first wireless communication device; and a second communication device located in a vicinity of the first communication device, wherein the first communication device includes:

a management information generation portion that generates a plurality of management information signals, wherein the plurality of management information signals are periodically transmitted to neighboring wireless communication devices located in the vicinity of the first wireless communication device for forming a wireless network, wherein the neighboring wireless communication devices include the second wireless communication device;

a data information generation portion that generates data information, wherein the data information is for transferring data to one or more of the neighboring wireless communication devices and wherein the data information are distinct from, and are transmitted separately from, the sequence of management information signals;

an operation instruction generation portion that generates an operation instruction aimed at the second wireless communication device;

an incorporation determination portion that makes an incorporation determination as to whether the operation instruction can be incorporated in a subsequent management information signal of the plurality of management information signals;

an incorporation portion that incorporates the operation instruction in the subsequent management information signal, if the incorporation determination indicates that the operation instruction can be incorporated in the subsequent management information signal; and a communication portion that transmits, to the second wireless communication device the subsequent management information signal.

* * * * *